United States Patent
Bell et al.

(10) Patent No.: US 9,481,524 B2
(45) Date of Patent: Nov. 1, 2016

(54) GUIDE RAIL SYSTEM WITH COVER ELEMENT

(71) Applicant: Septimatech Group Inc., Waterloo (CA)

(72) Inventors: Glen Albert Bell, Waterloo (CA); Alex Esten Eagle, Kitchener (CA)

(73) Assignee: Septimatech Group Inc., Waterloo, Ontario (CA)

( * ) Notice: Subject to any disclaimer, the term of this patent is extended or adjusted under 35 U.S.C. 154(b) by 0 days.

(21) Appl. No.: 14/628,916

(22) Filed: Feb. 23, 2015

(65) Prior Publication Data
US 2015/0239672 A1    Aug. 27, 2015

Related U.S. Application Data

(60) Provisional application No. 61/942,668, filed on Feb. 21, 2014.

(51) Int. Cl.
*B65G 47/00* (2006.01)
*B65G 21/20* (2006.01)

(52) U.S. Cl.
CPC ....... *B65G 21/2072* (2013.01); *B65G 21/2063* (2013.01); *B65G 2201/0244* (2013.01)

(58) Field of Classification Search
CPC ................................................. B65G 21/209
USPC ............................................ 198/836.1–836.4
See application file for complete search history.

(56) References Cited

U.S. PATENT DOCUMENTS

| | | | |
|---|---|---|---|
| 1,929,707 A * | 10/1933 | Mojonnier | B65G 21/2072 198/836.3 |
| 3,527,336 A | 9/1970 | Johnston | |
| 3,739,904 A * | 6/1973 | Windstrup | B65G 21/00 198/836.4 |
| 3,874,497 A * | 4/1975 | Carlson | B65G 21/2072 198/836.3 |
| 4,982,835 A | 1/1991 | Butler et al. | |
| 5,211,280 A | 5/1993 | Houde | |
| 5,291,988 A | 3/1994 | Leonard | |
| 5,492,218 A | 2/1996 | Falkowski | |
| 5,515,668 A | 5/1996 | Hunt et al. | |
| 5,517,798 A | 5/1996 | Klopfenstein | |
| 5,553,698 A * | 9/1996 | Patois | B65G 15/14 198/626.1 |
| 5,638,659 A | 6/1997 | Moncrief et al. | |
| 5,676,239 A * | 10/1997 | Mason | B65G 21/2072 198/836.1 |
| 5,682,976 A | 11/1997 | Jorgensen | |
| 5,782,339 A | 7/1998 | Drewitz | |
| 5,819,911 A | 10/1998 | Ledingham | |
| 5,860,511 A | 1/1999 | Ensch et al. | |
| 5,992,616 A | 11/1999 | Kliesow et al. | |
| 6,050,396 A | 4/2000 | Moore | |
| 6,360,880 B1 | 3/2002 | Ouellette | |
| 6,378,695 B1 | 4/2002 | Rinne | |
| 6,454,084 B2 | 9/2002 | Csiki et al. | |
| 6,488,449 B1 * | 12/2002 | Laquay | B65G 51/035 198/465.4 |
| 6,533,110 B1 | 3/2003 | Ledingham | |

(Continued)

*Primary Examiner* — William R Harp

(57) ABSTRACT

A guide rail system for guiding containers moved by one or more conveyors, each container having an interior portion defined therein for receiving a product and an opening in fluid communication with the interior portion. The guide rail system includes a cover assembly including one or more cover elements, and one or more structural elements to which the cover element is secured. The structural element locates the cover element in a preselected location relative to the openings of the containers, for at least partially impeding ingress of foreign matter to the interior portions of the containers.

12 Claims, 30 Drawing Sheets

(56) References Cited

U.S. PATENT DOCUMENTS

| | | |
|---|---|---|
| 6,578,702 B2 | 6/2003 | Falkowski |
| 6,591,978 B2 | 7/2003 | Ledingham |
| 6,736,573 B1 * | 5/2004 | Simkowski ........ B65G 51/035 198/836.4 |
| 6,827,205 B2 | 12/2004 | Ledingham |
| 6,889,823 B2 | 5/2005 | Delaporte et al. |
| 7,310,983 B2 | 12/2007 | Schill et al. |
| 7,395,920 B2 * | 7/2008 | Little ............... B65G 21/2072 198/370.03 |
| 7,431,150 B2 | 10/2008 | Ranger |
| 7,530,453 B2 | 5/2009 | Ingraham |
| 7,721,876 B2 | 5/2010 | Hartness et al. |
| 7,891,480 B2 * | 2/2011 | Lemaistre ........... B29C 49/4205 198/465.4 |
| 8,186,503 B1 | 5/2012 | Burchell et al. |
| 8,464,864 B2 | 6/2013 | Bell et al. |
| 8,490,780 B2 | 7/2013 | Bell et al. |
| 8,695,787 B2 | 4/2014 | Bell et al. |
| 8,851,806 B2 * | 10/2014 | Beutl ................... B29C 49/4205 198/836.3 |
| 2002/0189923 A1 | 12/2002 | Ledingham |
| 2003/0164280 A1 | 9/2003 | Delaporte et al. |
| 2006/0144015 A1 | 7/2006 | Cash, III et al. |
| 2011/0079493 A1 | 4/2011 | Bell et al. |
| 2012/0103763 A1 | 5/2012 | Bell et al. |

* cited by examiner

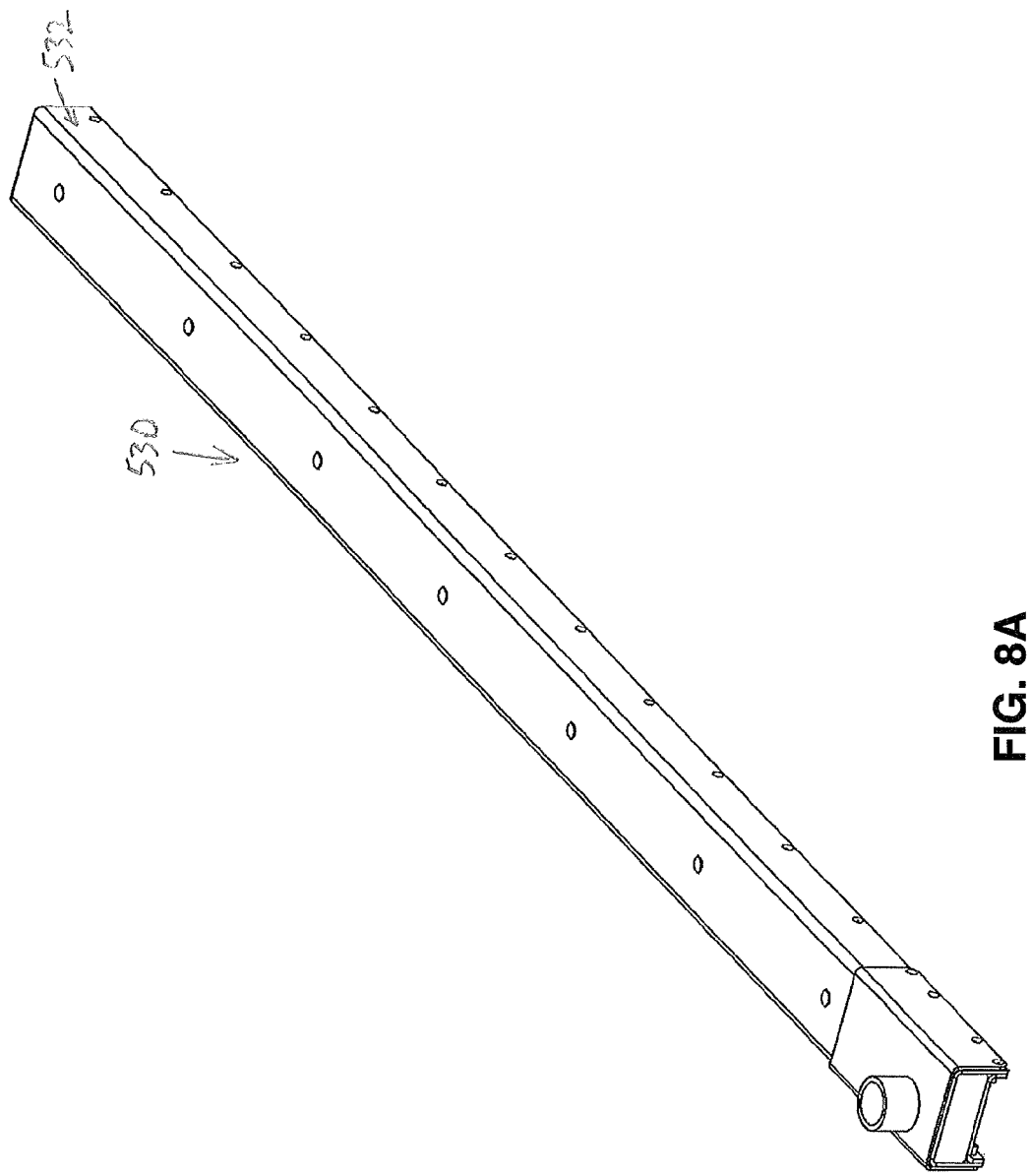

GUIDE RAIL SYSTEM WITH COVER ELEMENT

This application claims the benefit of U.S. Provisional Patent Application No. 61/942,668, filed Feb. 21, 2014, and incorporates such provisional patent application in its entirety by reference.

FIELD OF THE INVENTION

The present invention is a guide rail system for guiding containers moved by one or more conveyors that includes a cover element for impeding ingress of foreign matter to interior portions of the containers.

BACKGROUND OF THE INVENTION

Various guide rail systems are known that guide containers moved by one or more conveyors. As is well known in the art, an interior portion of each container defines a volume therein. Typically, the containers are respectively moved by the conveyors when they are empty, i.e., before a product has been positioned in the interior portion of each container, to a filling station. Access to the interior portion is via an opening that is in fluid communication with the interior portion. Once the interior portion has been filled with the product to the extent desired, a closure or cap is positioned on the opening.

As is well known in the art, there is a risk that foreign particles (e.g., dust particles) in the ambient air may enter the interior portion, via the opening. The foreign particles may enter the interior portion when the product is positioned in the interior portion, or before or after the product is positioned in the container. In the prior art, some efforts have been made to impede the ingress of foreign particles into the interior portion before the product is positioned therein, or during filling. However, the prior art devices are cumbersome and tend to interfere with the movement of the containers on the conveyor.

SUMMARY OF THE INVENTION

There is a need for a system that overcomes or mitigates one or more of the disadvantages or defects of the prior art. Such disadvantages or defects are not necessarily included in those described above.

In its broad aspect, the invention provides a guide rail system for guiding containers moved by one or more conveyors, each container having an interior portion defined therein for receiving a product and an opening in fluid communication with the interior portion. The guide rail system includes a cover assembly including one or more cover elements, and one or more structural elements to which the cover element is secured. The structural element is for locating the cover element in a preselected location relative to the openings of the containers, for at least partially impeding ingress of foreign matter to the interior portions of the containers.

In another aspect, the cover element includes a central contact portion for slidable engagement with one or more preselected parts of the containers when tipped, to at least partially locate the containers in predetermined locations respectively on the conveyor.

In yet another aspect, the cover element includes a number of apertures through which one or more gases are directed under a preselected pressure onto at least predetermined portions of the containers, to impede ingress of the foreign matter into the respective interior portions of the containers.

In yet another of its aspects, the invention provides a cover assembly locatable in a preselected position relative one or more conveyors for moving containers. Each container includes an interior portion for receiving a product therein and an opening in fluid communication with the interior portion. The cover assembly includes one or more cover elements defining a covered region in which a predetermined portion of each container is receivable when each container is positioned on the conveyor in predetermined locations, for at least partially impeding ingress of foreign matter into the interior portion of each container.

In another of its aspects, the invention provides a guide rail system for guiding containers moved by at least one conveyor. The conveyor defines a path along which the containers are moved thereby. Each container includes an interior portion defined therein for receiving a product and an opening in fluid communication with the interior portion. The guide rail system includes a cover assembly having one or more cover elements with one or more central contact portions for slidably engaging one or more preselected parts of the containers when tipped, to at least partially locate the containers in preselected positions relative to the path on the conveyor. The guide rail system also includes one or more central adjustable point devices for locating the central contact portion in a predetermined central location relative to each container to permit slidable engagement of the central contact portion with the preselected part of the container when tipped. The cover element is mounted to the central adjustable point device and positionable thereby in a preselected central location relative to the opening of the container, for at least partially impeding ingress of foreign matter to the respective interior portions of the containers.

In yet another of its aspects, the invention provides a method of impeding ingress of foreign matter into respective interior portions of containers movable by one or more conveyors. The interior portion of each container is in fluid communication with an opening thereof to permit a product to be received in the interior portion via the opening. The method includes providing a cover assembly with one or more cover elements defining a covered region in which a predetermined portion of each container is receivable, when each container is positioned in the predetermined location therefor of the conveyor. The cover element is positioned such that the predetermined portion of each container is movable through the covered region by the conveyor, to at least partially impede ingress of foreign matter into the respective interior portions of the containers.

BRIEF DESCRIPTION OF THE DRAWINGS

The invention will be better understood with reference to the attached drawings, in which:

FIG. 8A is an isometric view of another embodiment of the cover assembly of the invention, drawn at a smaller scale;

DETAILED DESCRIPTION

Figure 1A:
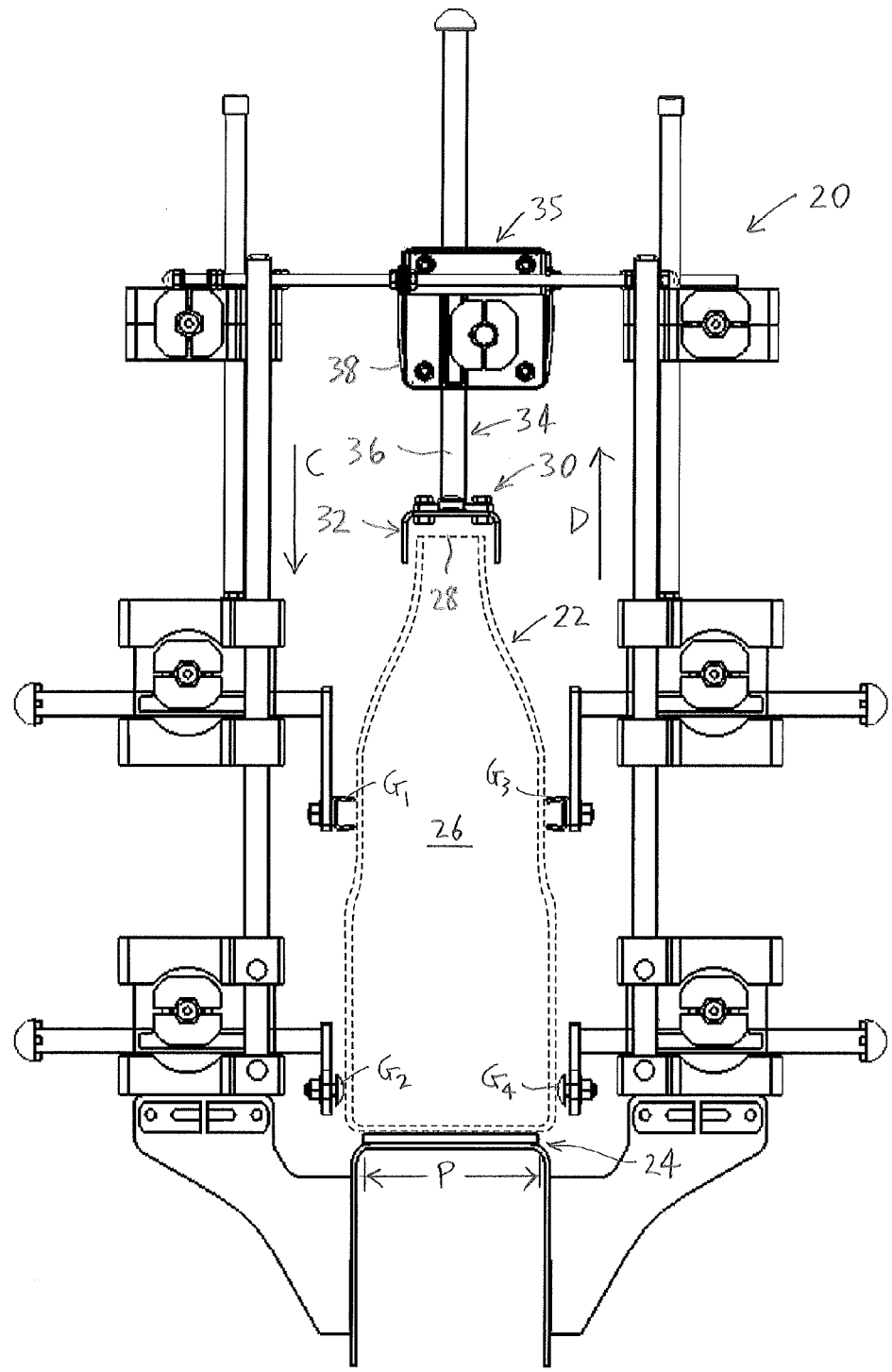
FIG. 1A is a side view of an embodiment of a guide rail system of the invention.

In the attached drawings, like reference numerals designate corresponding elements throughout. Reference is first made to FIGS. 1A-1D to describe an embodiment of a guide rail system in accordance with the invention indicated generally by the numeral 20. The guide rail system 20 is for guiding containers 22 (FIG. 1B) moved by one or more conveyors 24. Each container 22 includes an interior portion 26 defined therein for receiving a product (not shown) and an opening 28 in fluid communication with the interior portion 26 (FIG. 1B). In one embodiment, the guide rail system preferably includes a cover assembly 30 including one or more cover elements 32, and one or more structural elements 34 to which the cover element 32 is secured, for locating the cover element 32 in a preselected location relative to the openings 28 of the containers 22 positioned on the conveyor 24 (FIG. 1B), for at least partially impeding ingress of foreign matter to the interior portions 26 of the containers 22. As will be described, the containers 22 preferably are located in predetermined locations on the conveyor 24.

It will be understood that, for the purposes hereof, "foreign matter" means any matter (i.e., whether in the form of particles or otherwise) that is not intended to be included inside the container 22, i.e., inside the interior portion 26. Those skilled in the art would appreciate that the foreign matter may be, for example, airborne dust particles.

Figure 1B:
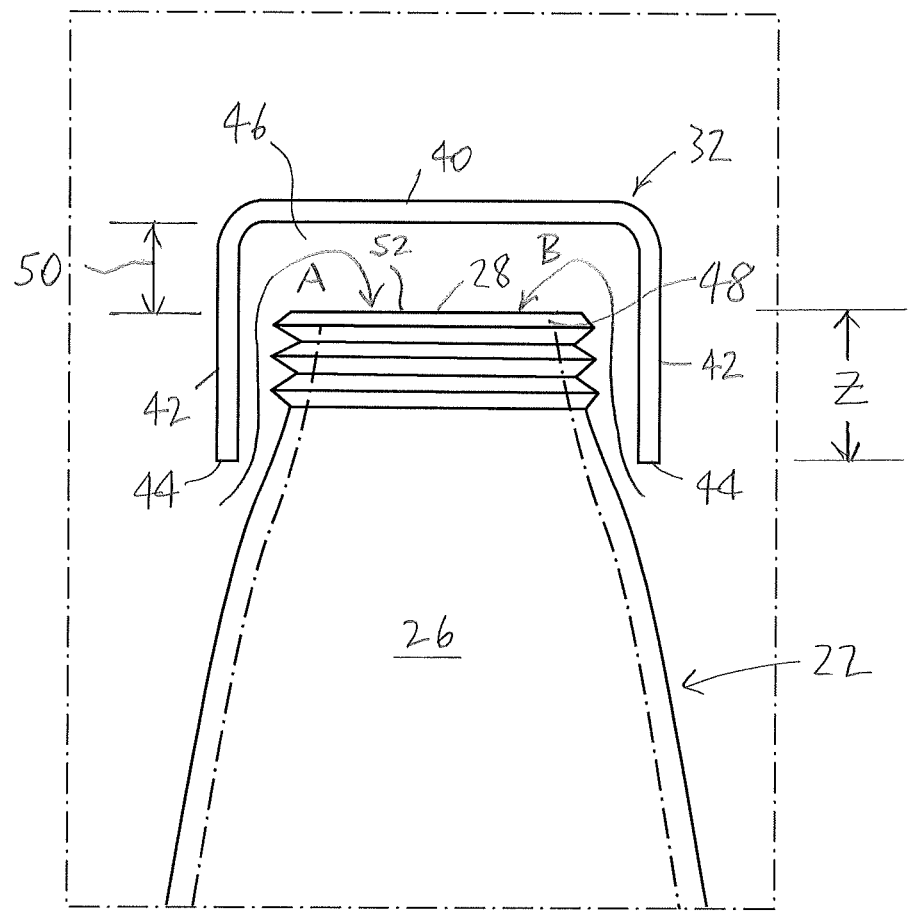
FIG. 1B is a side view of an embodiment of a cover assembly of the invention included in the guide rail system of FIG. 1A with a container located on a conveyor, drawn at a larger scale.
Figure 1C:
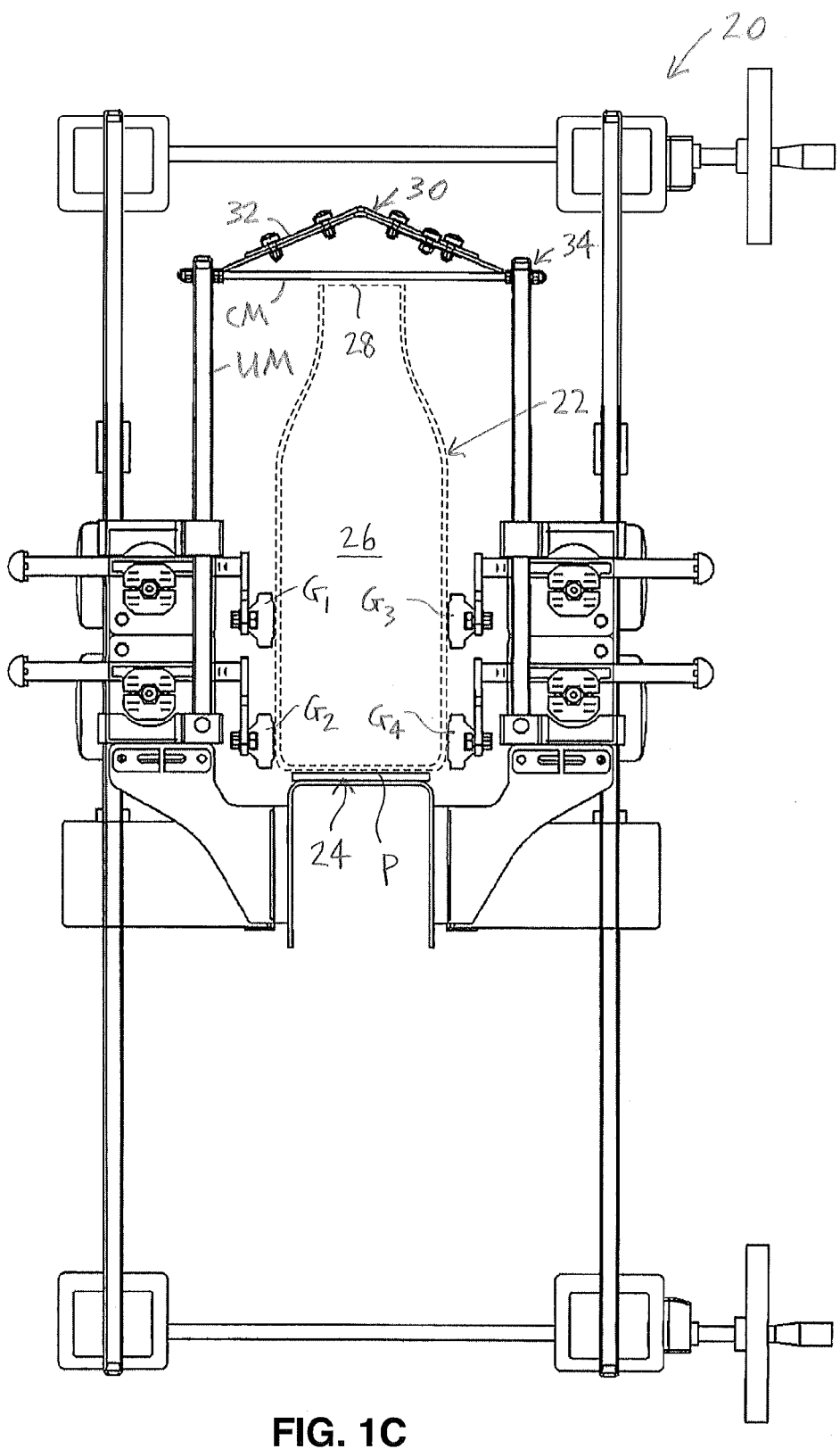
FIG. 1C is a side view of another embodiment of a guide rail system of the invention, drawn at a smaller scale.

The cover element 32 is shown in the preselected location relative to the opening 28 of the container 22 in FIGS. 1A, 1B, and 1C. (It will be understood that a number of elements are omitted from FIG. 1B for clarity of illustration.) As can be seen in FIG. 1B, it is preferred that the cover element 32 is positioned in the preselected location to impede ingress of foreign matter into the opening 28 of the container 22, i.e., impeding the foreign matter's ingress into the interior portion 26. For example, the paths required to be taken by small dust particles (i.e., foreign matter) in order for them to move into the opening 28 from outside the cover element 32 are schematically illustrated in FIG. 1B by arrows "A" and "B" in FIG. 1B. As can also be seen in FIG. 1B, in one embodiment, when the cover element 32 is in the preselected location relative to the opening 28 of the container 22, there is a gap 50 between one or more preselected parts 52 of the container 22 and the cover element 32.

Preferably, the gap 50 is relatively small. It is preferred that the paths "A" and "B" are as limited in size as possible, and as convoluted as possible, so that the ingress of the foreign matter into the interior portion 26 is more likely to be impeded or prevented by the cover element 32. For instance, in one embodiment, the gap 50 preferably is approximately 3 millimeters to approximately 5 millimeters (approximately 0.118 inch to approximately 0.197 inch).

Preferably, the size of the gap 50 is determined taking into account certain factors. The tolerance (or range) in the position of the preselected parts 52 relative to the conveyor 24, when the container 22 is in the predetermined location on the conveyor 24, is one factor. Such tolerance is the result of the process of manufacturing the container 22. In addition, it is preferred that some allowance is made for minor movements of the containers as they are moved by the conveyor.

It will also be understood that the cover element 32 may have any suitable form or shape, and may be made of any suitable materials. For example, the cover element may be made of a suitable polycarbonate, and formed in any suitable manner. Alternatively, the cover element may be made of any suitable metal, e.g., stainless steel.

Those skilled in the art would appreciate that the conveyor(s) 24 define a path "P" along which the containers 22 are moved thereby (FIG. 1A). (It will be understood that the path "P" as indicated in FIG. 1A is exemplary only.) It will be understood that, as illustrated in FIGS. 1A and 1C, the container 22 is located in the predetermined location on the conveyor 24, and the predetermined location is on the path "P", i.e., the predetermined location is coincident with the path "P". Those skilled in the art would appreciate that the container 22 may be laterally guided and located on the conveyor 24 by any suitable lateral guide rails, to position the container 22 in the predetermined location on the conveyor 24. For instance, in one embodiment, the container 22 preferably is at least partially located in the predetermined location on the conveyor 24 by lateral guide rails "$G_1$", "$G_2$", "$G_3$", and "$G_4$", as illustrated in FIGS. 1A and 1C. Those skilled in the art would also appreciate that various types of lateral guides, positioned as required, may be used to at least partially laterally locate the container 22 in the predetermined location on the conveyor 24. Those skilled in the art would appreciate that there are various known lateral guides, and the adjustment thereof may be effected using various known means. Preferably, the lateral guides "$G_1$"-"$G_4$" are uniformly adjustable via mechanisms described in U.S. Pat. Nos. 8,490,780 and 8,464,864, the entire disclosures of which are hereby incorporated by reference.

It will be understood that the predetermined location, which is on the path "P", may be any suitable location on the conveyor(s) 24. For instance, in the attached drawings, the predetermined location is shown as being substantially in the center of the conveyor 24 (i.e., as illustrated in FIG. 1B), however, those skilled in the art would appreciate that the predetermined location may alternatively be any suitable non-centered location on the conveyor 24.

The structural element 34 preferably is any suitable structure that locates the cover assembly 30 so that the cover element 32 is in the preselected position relative to the opening of the container 22, when the container 22 is positioned on the conveyor 24. For example, as illustrated in FIG. 1C, the structural element 34 may be a non-adjustable support structure. As can be seen in FIG. 1C, in one embodiment, the generally non-adjustable support structure 34 preferably includes one or more upright members "UM" and one or more cross-members "CM". It will be understood that, although the cover element 32 may have any suitable shape, in one embodiment, it preferably has a peak, as illustrated in FIG. 1C.

However, in another embodiment, it is preferred that the structural element 34 is a central adjustable point devices 35, as illustrated in FIGS. 1A and 1B. It is also preferred that the central adjustable point device 35 includes a central adjustment element 36. In this embodiment, and as shown in FIG. 1A, the cover assembly 32 preferably is secured to the central adjustment element 36. The ability to easily change the position of the cover element 32 relative to the container 22 (i.e., by adjustment of the position of the central adjustment element 36 via the central adjustment point devices 35) may be important in situations where the size of the container 22 is changed from time to time.

As can be seen in FIG. 1A, the central adjustment element 36 preferably is mounted to a main central portion 38 of the central adjustable point device 35 so that the central adjustment element 36 is movable substantially vertically relative thereto, i.e., in the directions indicated by arrows "C" and "D" in FIG. 1A. It can be seen from FIGS. 1A and 1B that, in this arrangement, the position of the cover element 32 relative to the conveyor 24 (and also relative to the container 22) can easily be changed. This arrangement permits the cover element 32 to be moved to a new preselected location relative to the opening 28 when the container 22 is changed, e.g., when a smaller or a larger container is to be used. It will be understood that lateral movement of the central adjustable point device 35 may be effected also, if necessary, to accommodate a change in the path "P" on the conveyor(s) 24.

Figure 1D:
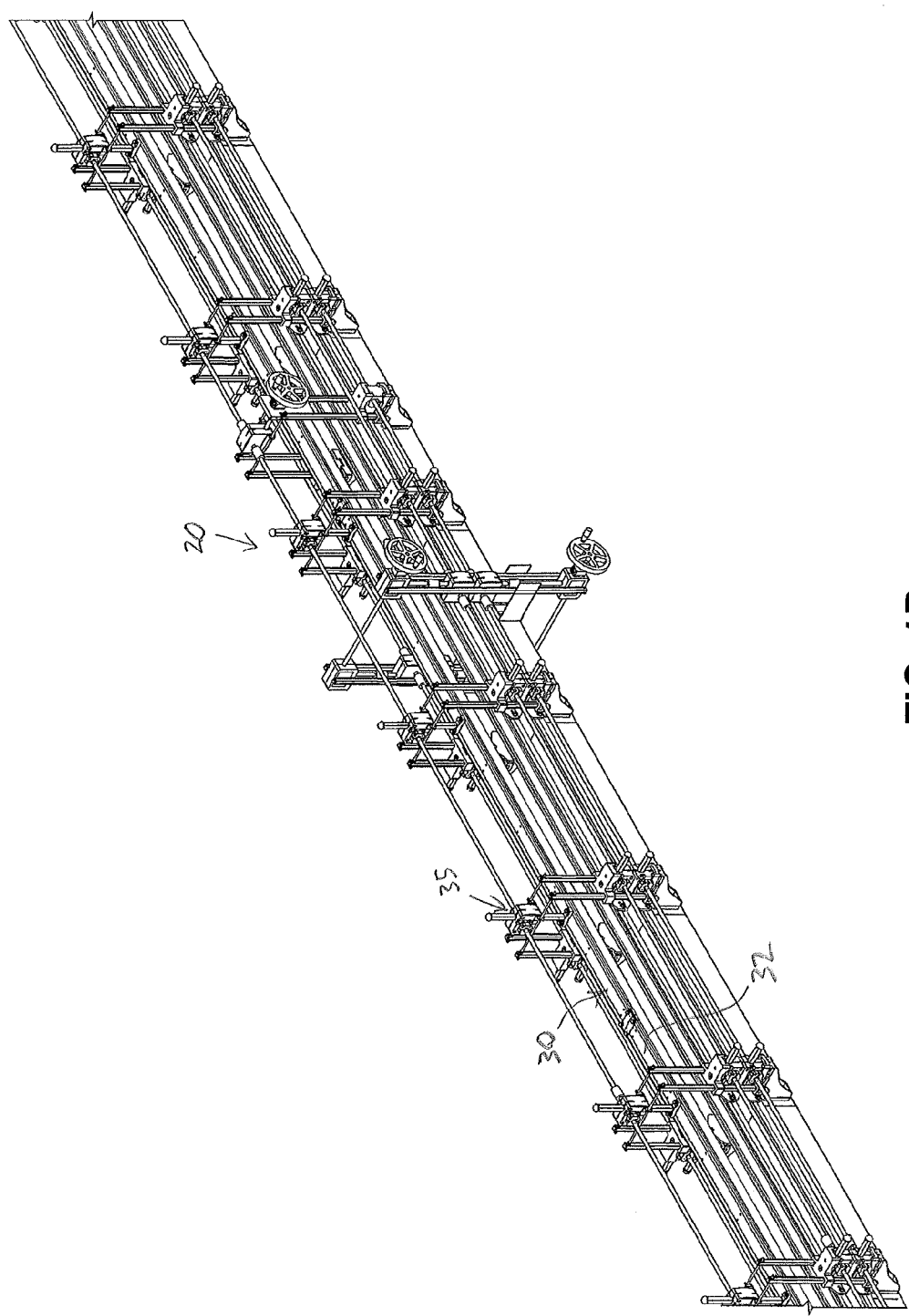
FIG. 1D is an isometric view of the guide rail system of FIG. 1A, drawn at a smaller scale.

It will be understood that the guide rail system 20 preferably includes a number of central adjustable point devices 35 positioned along the length of the conveyor(s) 24, as illustrated, for example, in FIG. 1D. Those skilled in the art would appreciate that the central adjustable point devices 35 preferably are spaced apart from each other along the conveyor(s) 24 at suitable intervals. Those skilled in the art would also appreciate that one or more fill stations (not shown) may also be positioned on or along the length of the conveyor 24, as required. At the fill station(s), the product (or parts thereof) that is to be positioned in the interior portion 26 of the container 22 is directed therein, as is known. Preferably, and as can be seen in FIG. 1D, the cover element 32 extends continuously between the respective central adjustable point devices 35. In this way, the ingress of foreign matter into the interior portions 26 of the containers 22 is impeded as the containers 22 are moved along the part of the conveyor(s) 24 where the cover element 32 is located.

In one embodiment, the cover element 32 preferably includes a central portion 40 and one or more side portions 42 connected thereto (FIG. 1B). Preferably, the cover element is located by the central adjustment point device 35 to position the side portion(s) 42 to at least partially impede airborne movement of the foreign matter into the respective interior portions 26 of the containers 22. Those skilled in the art would appreciate that, to accomplish this, the cover element may have various configurations.

Figure 2:
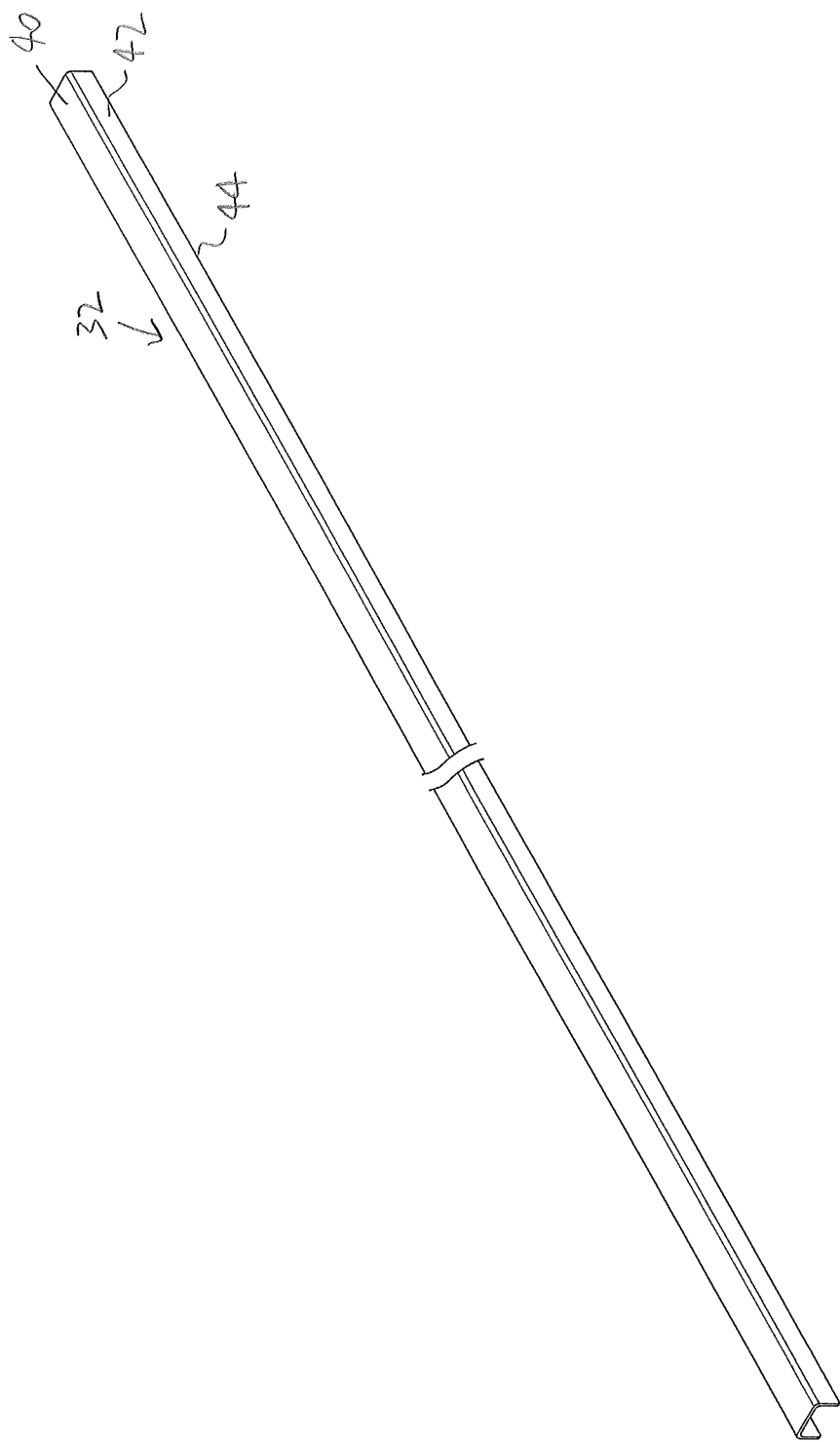
FIG. 2 is an isometric view of an embodiment of the cover assembly of the invention, drawn at a smaller scale.

For instance, in one embodiment, the side portion(s) 42 extend from the central portion 40 to respective lower edges 44 of the side portion(s) 42, as illustrated in FIGS. 1B and 2. Also, the cover element 32 preferably is positioned to locate the lower edge 44 of each of the side portions 42 in a preselected location thereof relative to the opening 28 of the container, when the container 22 is on the conveyor 24 (FIG. 1B).

In one embodiment, it is preferred that the cover element 32 at least partially defines a covered region 46 (FIG. 1B) in which a predetermined portion 48 of each container 22 is receivable to locate the predetermined portion 48 of each container 22 substantially inside the cover element 32. As can be seen in FIG. 1B, when the container 22 is in the predetermined location on the conveyor 24 and the cover element 32 is in the preselected position relative to the opening 28, the predetermined portion 48 of the container is located in the covered region 46.

As noted above, the cover element preferably is positioned relative to the container in order to impede ingress of the foreign matter into the interior portion 26 of the container. It has been determined that at least approximately 0.25 inch (approximately 0.635 cm) of the container 22 preferably should extend above the edge 44 of the cover element. For example, in FIG. 1B, the length of the container 22 extending above the edge 44 is identified as "Z" for convenience.

Figure 3:
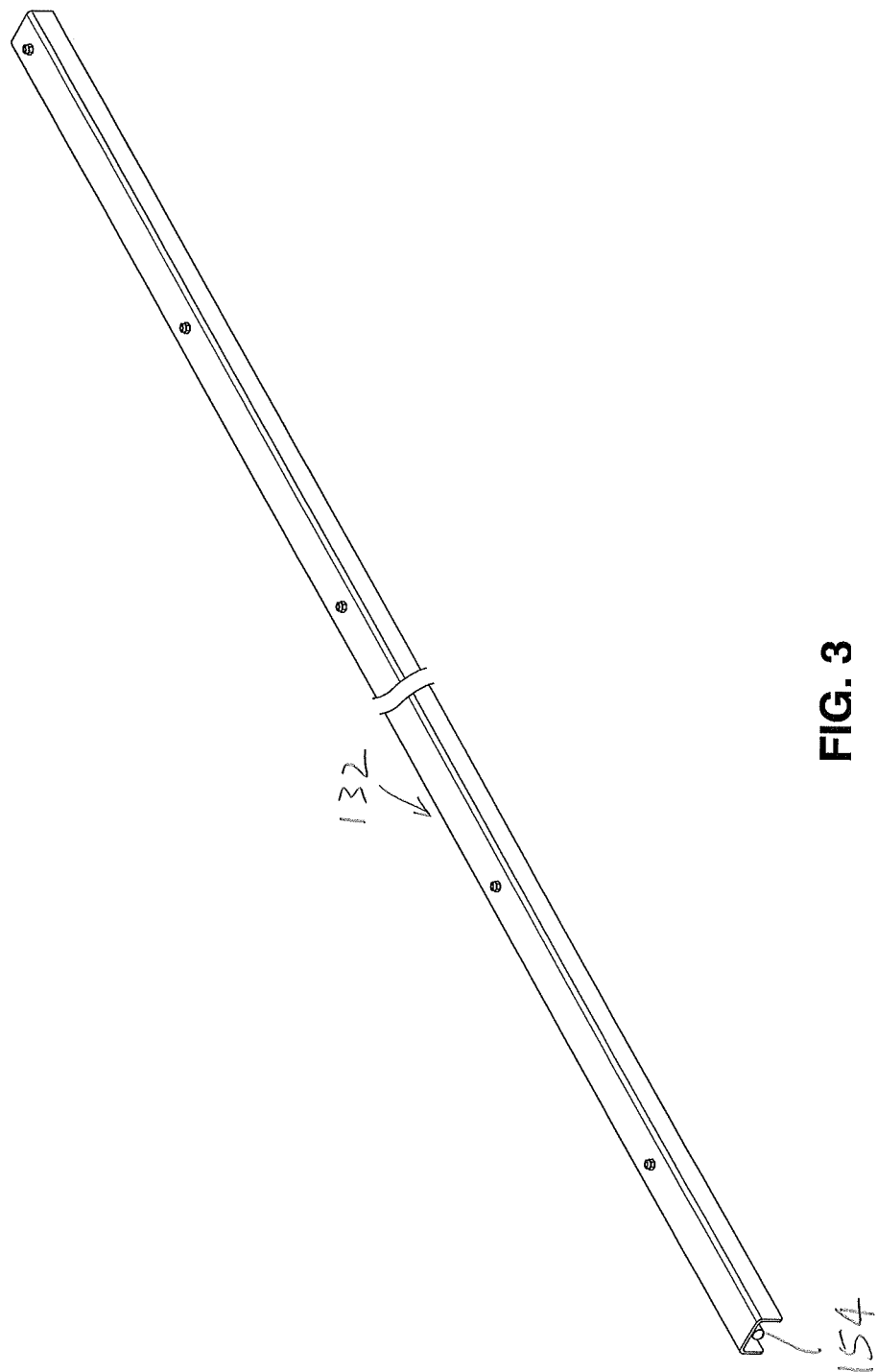
FIG. 3 is an isometric view of an alternative embodiment of the cover assembly of the invention.
Figure 4A:
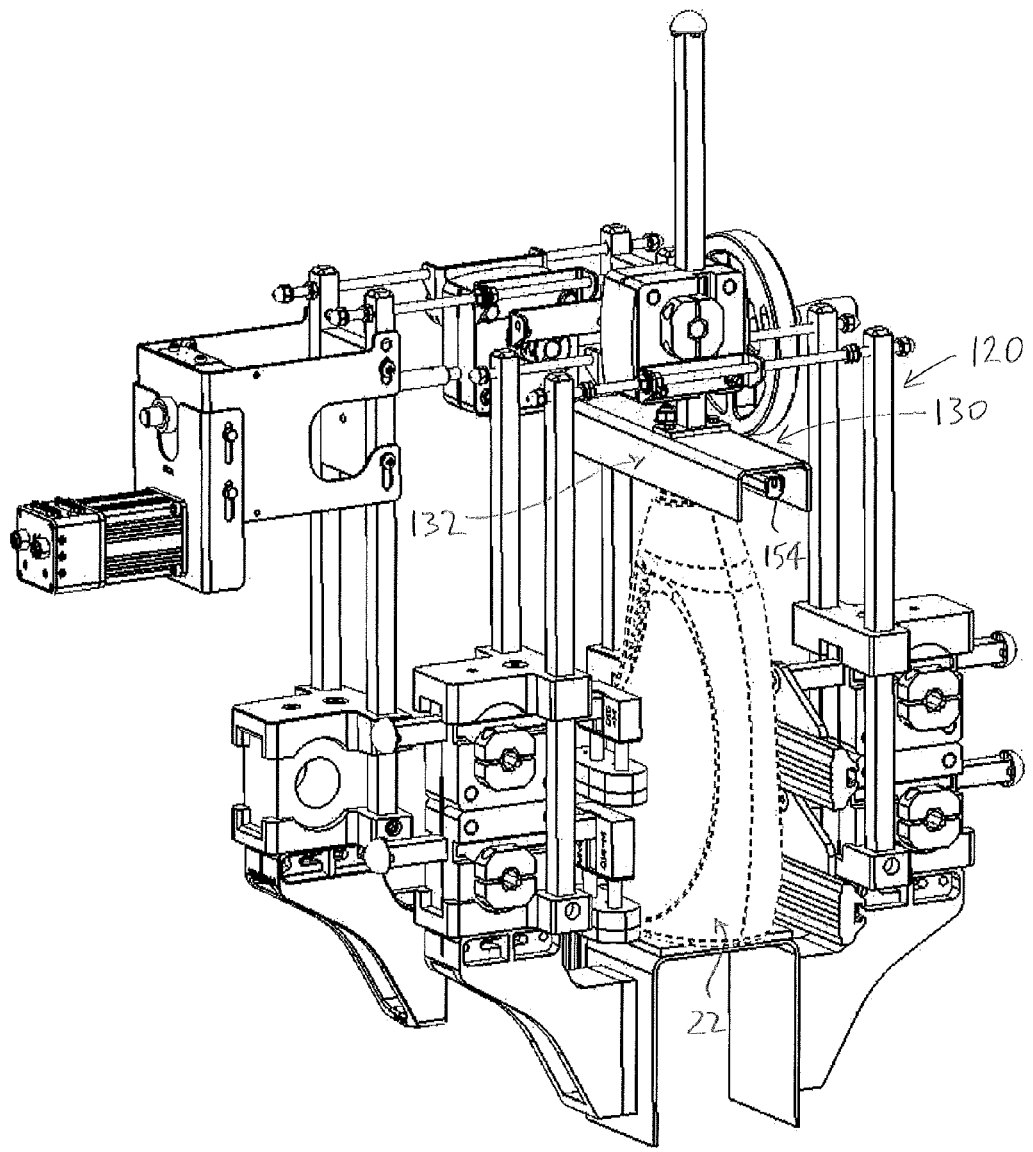
FIG. 4A is an isometric view of a portion of another embodiment of a guide rail system of the invention with the container located on the conveyor, drawn at a larger scale.

As noted above, the container 22 preferably is at least partially located on the conveyor 22 by lateral guides, e.g., "$G_1$"-"$G_4$" in FIG. 1A. However, it may be desirable for the cover assembly to engage the preselected parts 52 of the container 22, when the container tips as it is moved by the conveyor(s) 24, to stabilize the container 22. Accordingly, in one embodiment (illustrated in FIGS. 3-4C), the guide rail system 120 of the invention preferably includes an embodiment of the cover assembly 130 that includes one or more cover elements 132 having one or more central contact portions 154 for slidable engagement with the preselected parts 52 of the container 22 when tipped, to at least partially locate the containers 22 in the predetermined location on the conveyor 24. The cover element 132 defines a covered region 146. The central control portion 154 is an anti-tipping control element. It is preferred that the central contact portion 154 is formed so that it slidably engages the preselected parts 52 of the containers 22 as the containers 22 are moved past the central contact portion 154 (FIGS. 4B, 4C), if the containers 22 are tipping. As will be described, the central contact portion 154 preferably engages the preselected parts 52, if the container 22 tips, to maintain the container 22 in the preselected location on the conveyor. As can be seen in FIG. 4C, the cover element 132 preferably is positioned so that the central contact portion 154 defines a gap 150 between the central contact portion 154 and the preselected parts 52 of the containers 22. The gap 150 preferably is any suitable distance. The gap 150 may be determined according to various factors, e.g., the tolerances in respect of the height of the containers 22. In one embodiment, the gap 150 preferably is between approximately 3 millimeters to approximately 5 millimeters (approximately 0.118 inch to approximately 0.197 inch). In addition, the lateral guides "$G_1$"-"$G_4$" (FIG. 4B) preferably position the respective containers 22 in the predetermined location(s) on the conveyor 24, as described above. It will be understood that the lateral guides may be in any suitable forms.

Preferably, the central contact portion 154 is formed specifically to stabilize the specific containers moved past the cover element 132, as will be described. The central contact portion 154 may be made of any suitable material(s), and it may be formed to have any suitable shape. For example, in one embodiment (illustrated in FIG. 4C), the central contact portion 154 preferably includes a substantially central region 156 thereof that is a rounded surface area positionable for engagement with the preselected parts 52 of the container 22, when tipped.

Figure 4B:
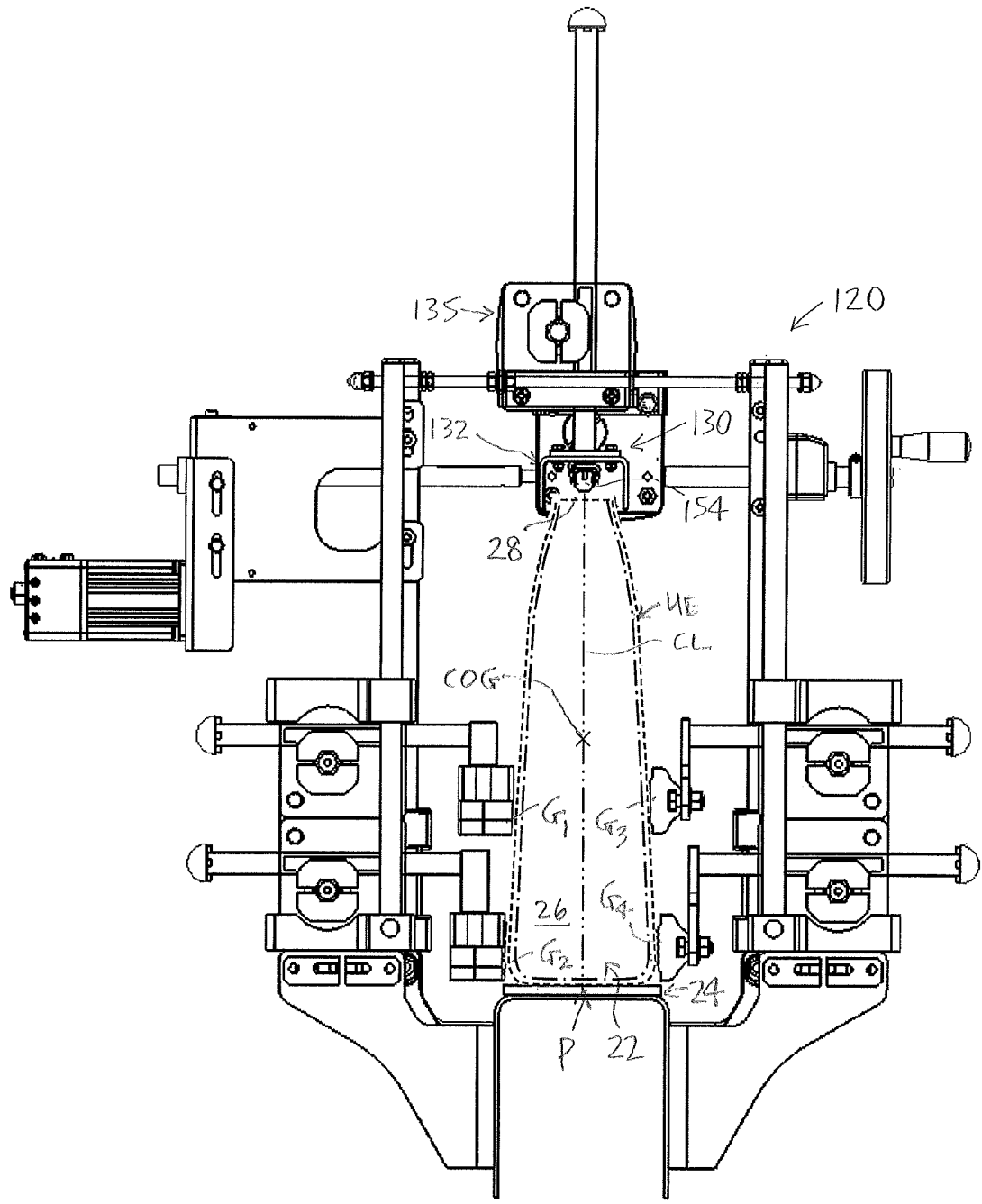
FIG. 4B is a side view of the guide rail system of FIG. 4A with the container located on the conveyor.
Figure 4C:
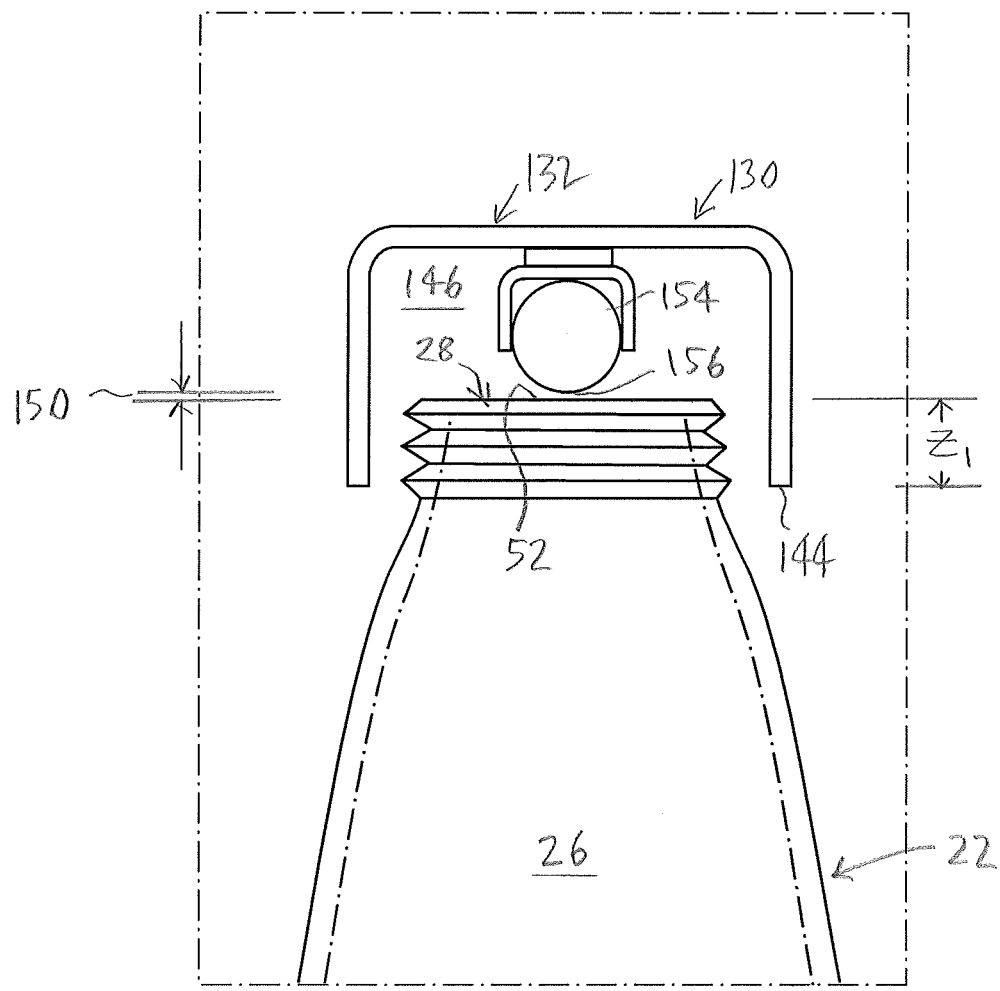
FIG. 4C is a side view of the cover assembly included in the guide rail system of FIGS. 4A and 4B, drawn at a larger scale.
Figure 4D:
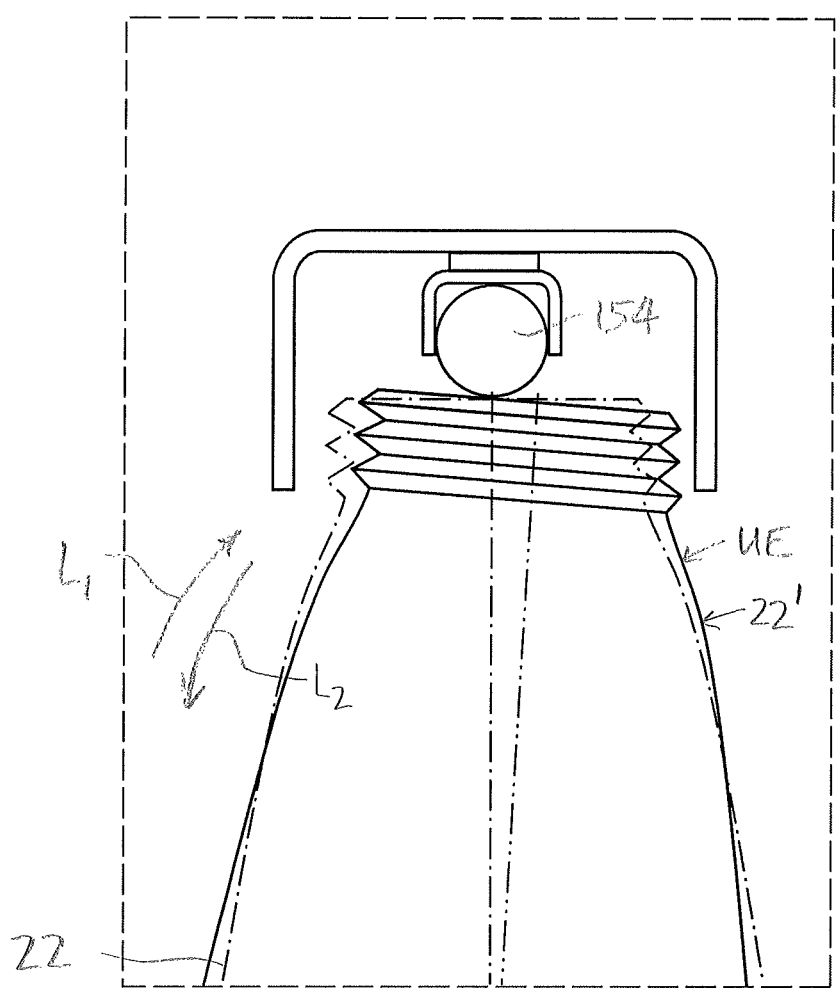
FIG. 4D is a side view of the cover assembly of FIG. 4B showing the container when it is transversely tipped.
Figure 4E:
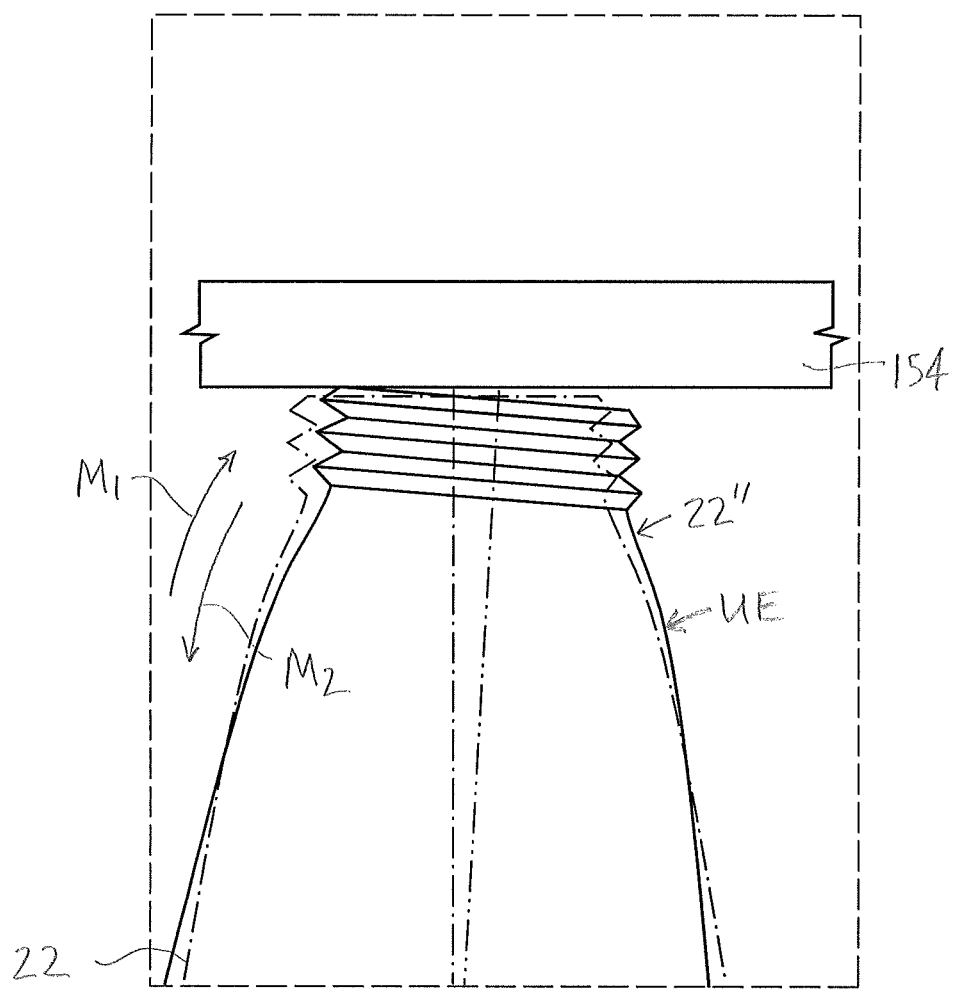
FIG. 4E is another (longitudinal) side view of the cover assembly of FIGS. 4A-4D showing the container when it is longitudinally tipped.

The container 22 is partly defined by a center line "CL" thereof (FIG. 4B). It will be understood that the outer contours of the container may not necessarily be symmetrical relative to the center line "CL", however, the container (whether with product in the interior portion 26 thereof or not) has a center of gravity "COG" on the center line "CL" (FIG. 4B). An upper end "UE" of the container is the part of the container 22 that is above the center of gravity "COG". As can be seen in FIG. 4B, when the container 22 is in the predetermined location on the conveyor 24, the center line "CL" and the center of gravity "COG" (and the upper end "UE") are aligned with the predetermined location on the path "P". Those skilled in the art would appreciate that, when the container 22 tips, the upper end "UE" is non-aligned with the path "P". Such non-alignment may occur, as can be seen in FIG. 4D, if the container's upper end is moved transversely relative to the path "P". Such tipping also may occur if the upper end "UE" of the container 22 is moved longitudinally pathwise, i.e., ahead of or behind the center of gravity "COG" (FIG. 4E). In this case, the upper end is not vertically aligned with the center of gravity "COG", i.e., the container is tipped forward or backward. As those skilled in the art would appreciate, the non-alignment may also result from a combination of transverse and longitudinal movements of the upper end "UE" of the container 22 relative to the conveyor.

Those skilled in the art would also appreciate that the non-alignment of the center of gravity "COG" with the path (i.e., transverse tipping), or the non-vertical positioning of the upper end of the container with its center of gravity (i.e., longitudinal tipping), or a combination of both, may result from time to time from movement of the containers by the conveyor(s) 24. For the purposes hereof, the container is "tipped" when its upper end 48 is non-aligned vertically with the center of gravity "COG".

As can be seen, for example, in FIG. 4D, the transversely tipped container (identified by reference numeral 22' for convenience) is engaged at its predetermined parts 52 by the central contact portion 154, which engagement stops the transverse tipping movement of the container. That is, the central contact portion 154 functions as a stop. Due to gravity, after the tipping movement has been stopped, the container 22 thereafter returns to the predetermined location therefor on the conveyor 24. In FIG. 4D, the container 22, when it is in the predetermined location on the conveyor 24, is shown in dashed outline for clarity of illustration. The transverse tipping movement of the container is schematically illustrated by arrow "$L_1$". The returning movement of the container to the predetermined location (i.e., under the influence of gravity) is schematically illustrated by arrow "$L_2$" in FIG. 4D.

Similarly, and as illustrated in FIG. 4F, the longitudinally tipped container (identified by reference numeral 22" in FIG. 4E for convenience) is engaged at its predetermined parts 52 by the central contact portion 154. Such engagement stops the longitudinal tipping movement of the container 22", which then is returned to the predetermined location therefor on the conveyor by gravity.

In FIG. 4E, the container 22, when it is in the predetermined location on the conveyor 24, is shown in dashed outline. The longitudinal tipping movement of the container is schematically illustrated by arrow "$M_1$". The returning movement of the container to the predetermined location (i.e., under the influence of gravity) is schematically illustrated by arrow "$M_2$" in FIG. 4E. It will be understood that the tipping movements of the container as illustrated in FIGS. 4D and 4E are exemplary only. The transverse tipping movement may be to the left or to the right, and the longitudinal tipping movement may be backwards or forwards. Also, as noted above, the container's tipping movement may be a combination of transverse and longitudinal tipping movements.

The guide rail system 120 is for guiding the containers 22 moved by one or more conveyors 124. The conveyor(s) 124 define a path "P" (FIG. 4B) along which the containers 22 are moved thereby. Preferably, the guide rail system 120 also includes one or more central adjustable point devices 135 for locating the central contact portion 154 in a predetermined central location relative to each of the containers 22 to permit slidable engagement of the central contact portion 154 with the preselected part(s) 52 of the container 22 when tipped (FIGS. 4D, 4E). It is also preferred that the cover assembly 130 additionally includes one or more cover elements 132 mounted to the central adjustable point device 135 and positionable thereby in the preselected position relative to the opening 28 of the container 22, for at least partially impeding ingress of foreign matter to the respective interior portions 26 of the containers 22.

In FIG. 4C, the vertical distance between a lower edge 144 of the cover element 132 and the preselected part 52 of the container 22 is identified for convenience as "$Z_1$". It will be understood that the distance "$Z_1$" may be any suitable distance. For instance, in one embodiment the distance "$Z_1$" preferably is at least 0.25 inch (approximately 0.635 cm).

It will be understood that the predetermined central location is not necessarily central relative to the conveyor(s) 24. Preferably, the central contact portion 154 is positioned relative to the container 22, when the container 22 is in the predetermined location on the conveyor 24, so that the preselected parts 52 of the container 22 are engaged with the central contact portion 154 along the central region 156 thereof. In FIG. 4C, the central contact portion 154 is shown in the predetermined central location. When the central contact portion 154 is so located, it is positioned for slidable engagement with the preselected parts 52 of the containers 22 that are tipping, i.e., off balance. Similarly, the cover element 132 is shown in FIG. 4C in the preselected position relative to the opening 28 of the container 22, when the container 22 is in its predetermined location on the conveyor 24.

It will be understood that a number of elements are omitted from FIGS. 4C, 4D, and 4E for clarity of illustration.

Figure 5A:
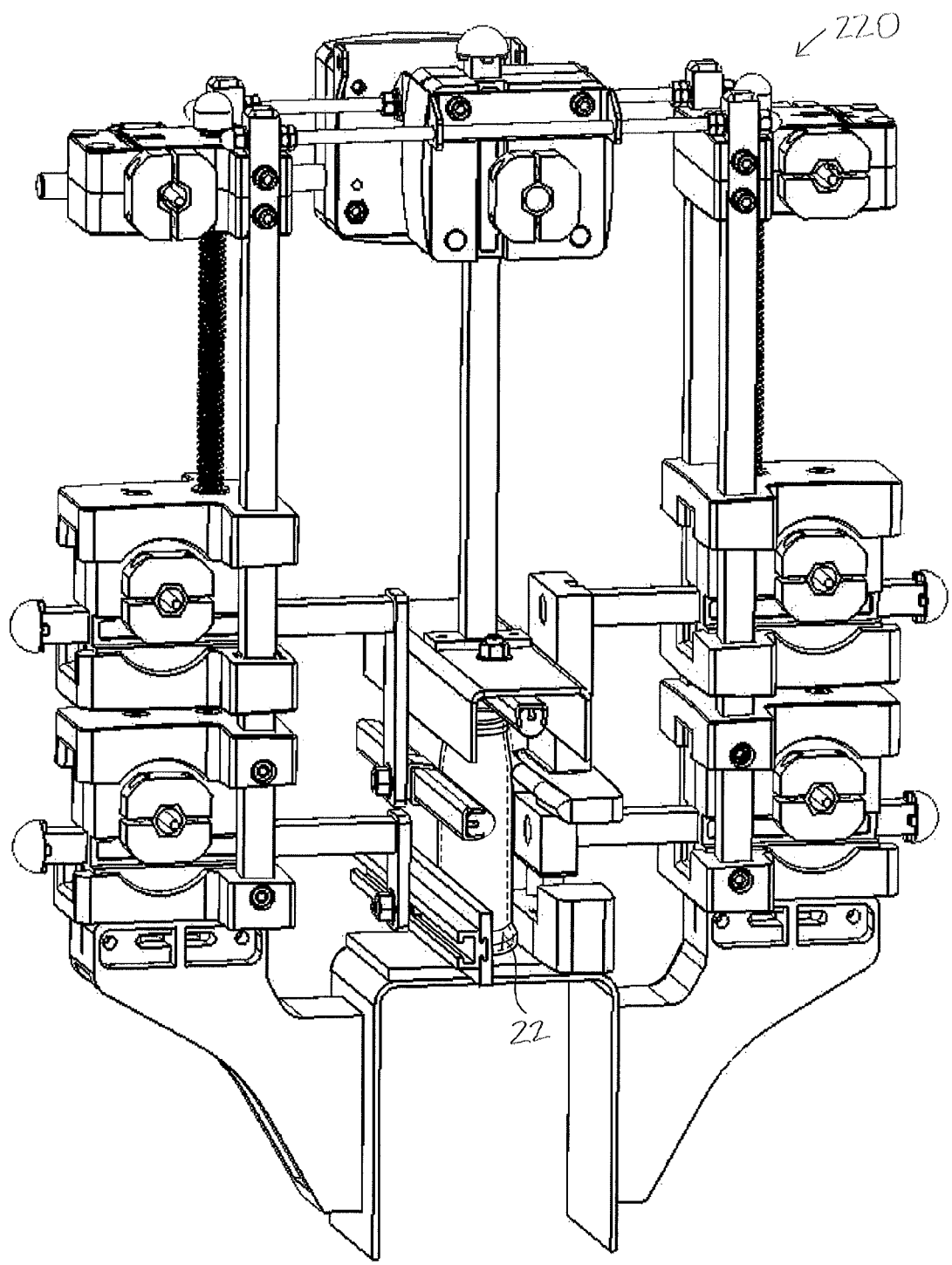
FIG. 5A is an isometric view of another embodiment of the guide rail system of the invention, drawn at a smaller scale.
Figure 5B:
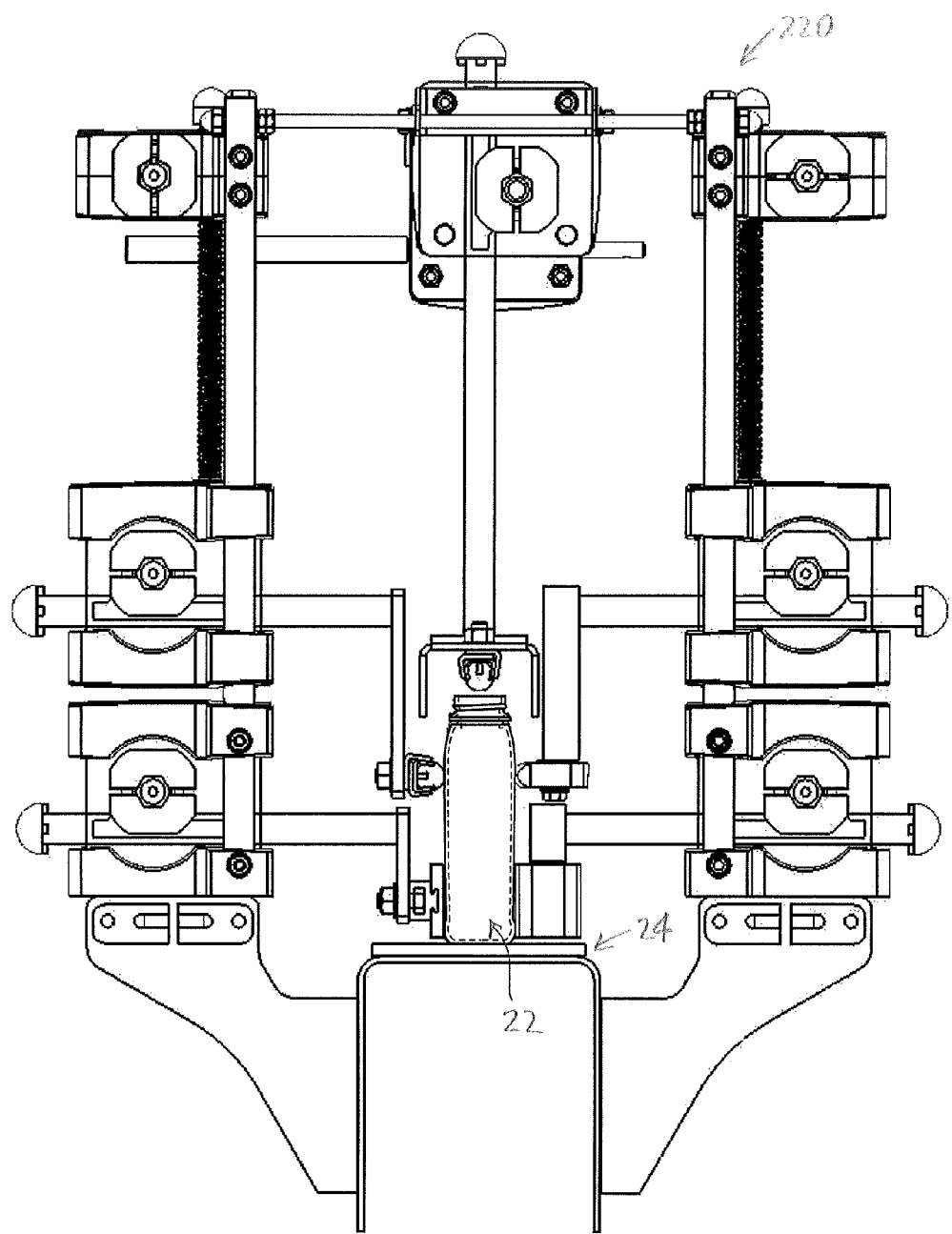
FIG. 5B is a side view of the guide rail system of FIG. 5A with the container located on the conveyor.

Another embodiment of the guide rail system 220 of the invention is shown in FIGS. 5A and 5B. In these drawings, the system 220 adapted for a relatively small container 22 is illustrated.

Figure 6A:
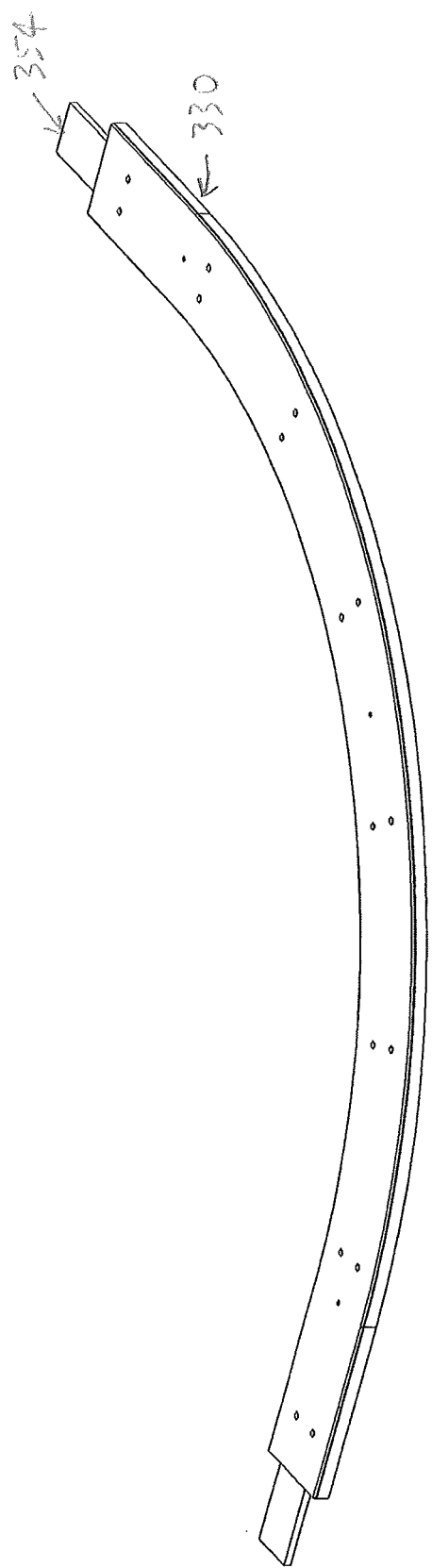
FIG. 6A is an isometric view of another alternative embodiment of the cover assembly of the invention, drawn at a smaller scale.
Figure 6B:
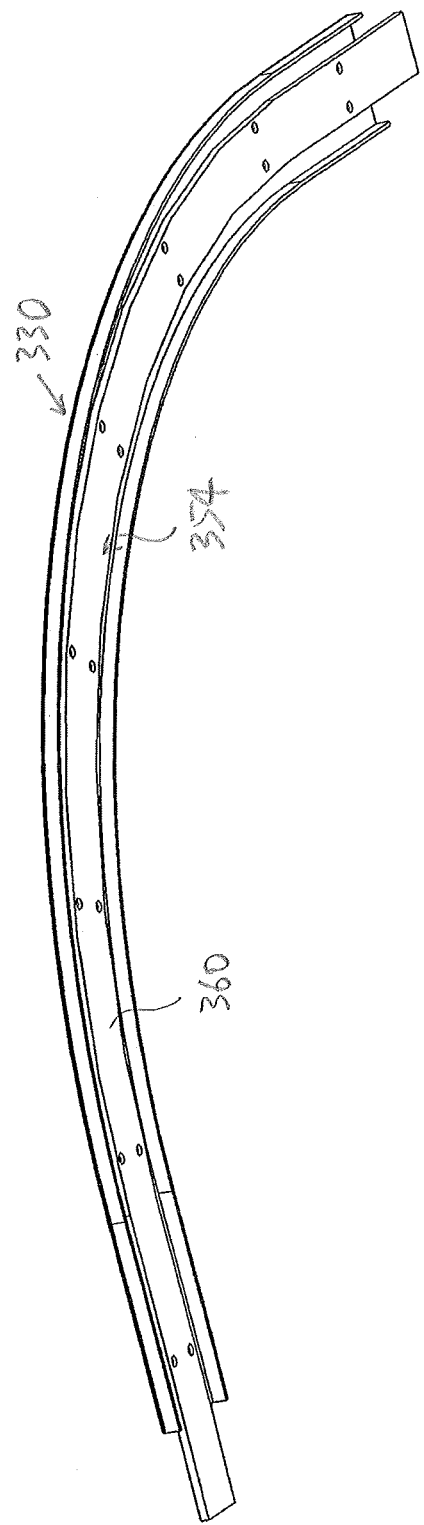
FIG. 6B is another isometric view of the cover assembly of FIG. 6A.
Figure 6C:
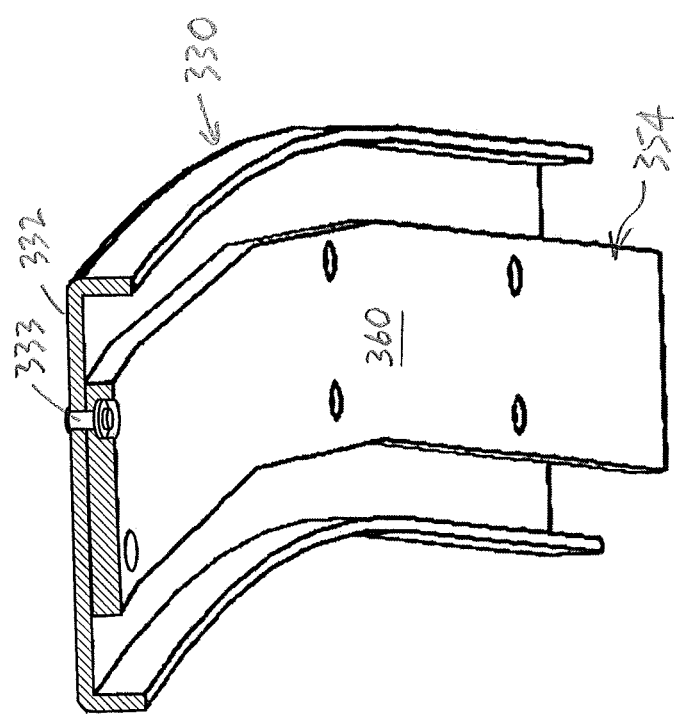
FIG. 6C is another isometric view of the cover assembly of FIGS. 6A and 6B, including a cross-section thereof.
Figure 6D:
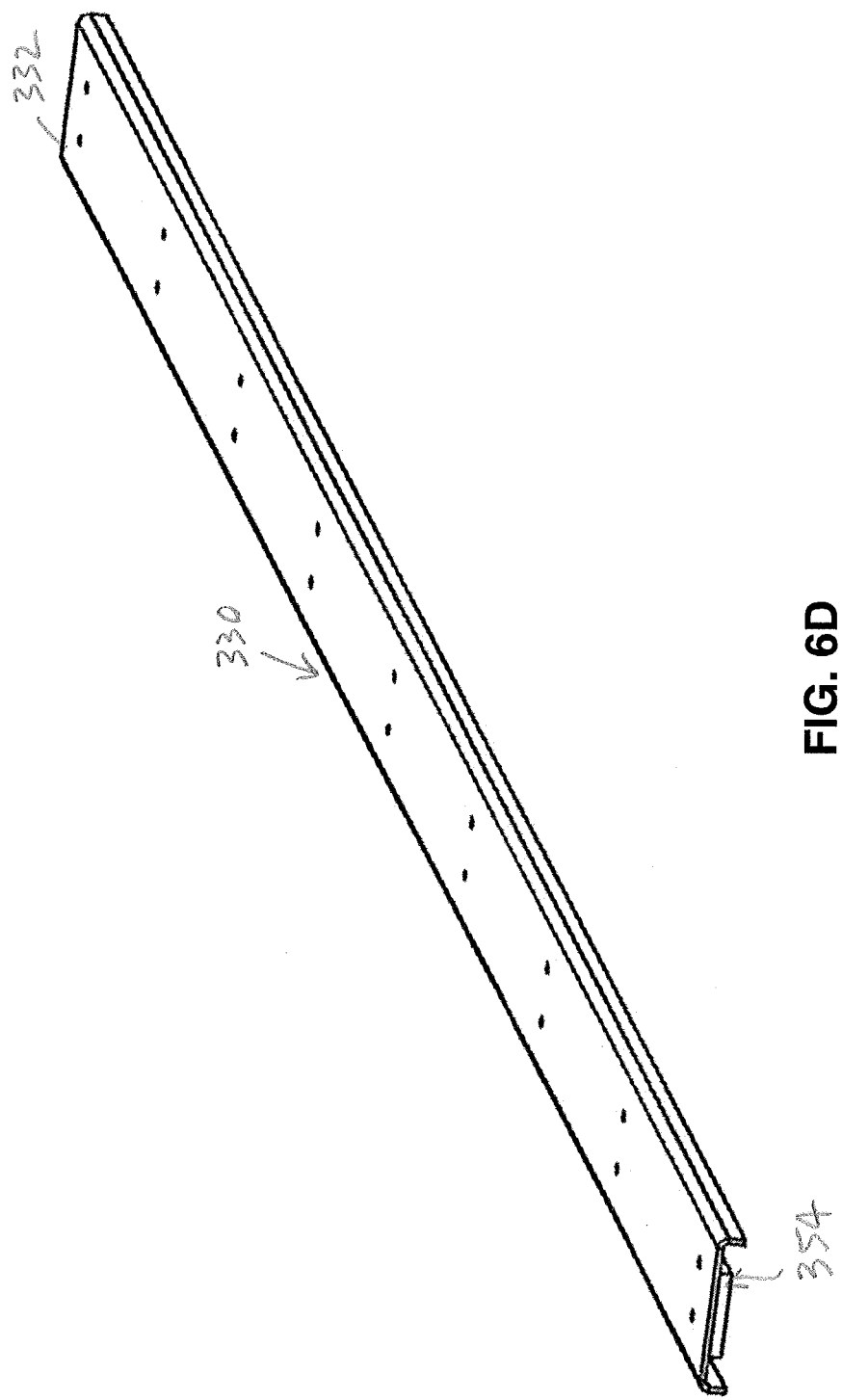
FIG. 6D is an isometric view of another embodiment of the cover assembly of the invention.
Figure 6E:
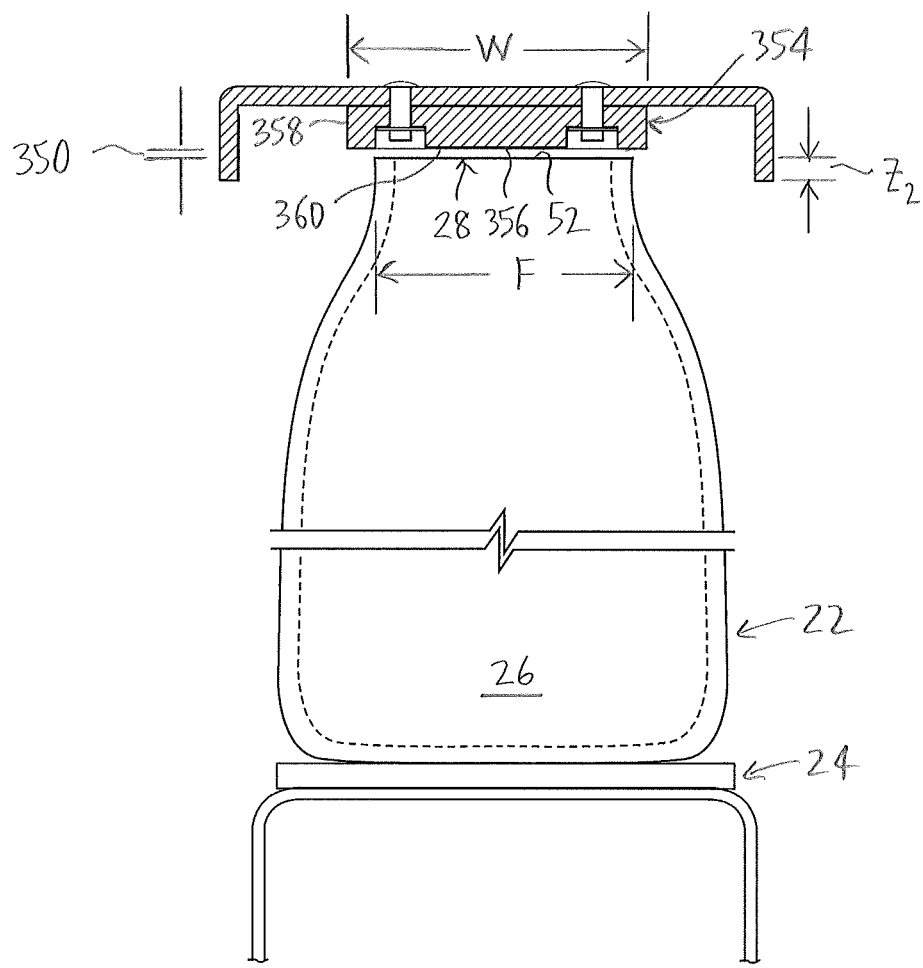
FIG. 6E is a cross-section of the cover assembly of FIG. 6D with the container located on the conveyor, drawn at a larger scale.

In another embodiment, illustrated in FIGS. 6A-6E, the cover assembly 330 of the invention preferably includes a cover element 332 that has an embodiment of the central contact portion 354 with one or more sheets 358 having a substantially planar surface 360 engageable with the preselected part(s) 52 of the container 22 when tipped (FIG. 6E). As can be seen, for example, in FIG. 6E, in one embodiment, the sheet 358 preferably is wider than the preselected part 52. For example, as shown in FIG. 6E, the width "W" of the sheet 358 is greater than the corresponding dimension "F" of the preselected part 52, which is engaged by the surface 360. The preselected part 52 of the container 22 that is tipping (i.e., off balance) preferably is engaged by a central region 356 of the sheet 358. As in other embodiments described above, the central contact portion 354 is an anti-tipping control.

The substantially vertical distance between the preselected parts 52 of the container and the lower edge 344 of the cover element is identified as "$Z_2$" in FIG. 6E. This distance preferably is at least about 0.25 inch (approximately 0.635 cm). It will be understood that a number of elements are omitted from FIG. 6E for clarity of illustration.

Those skilled in the art would appreciate that the sheet(s) 358 of the central contact portion 354 may be made of any suitable material. It is preferred that such material has low coefficient of friction. In one embodiment, for instance, the sheet 358 preferably is made of ultra-high-molecular-weight polyethylene. The cover assembly 330 preferably includes a cover element 332. It is also preferred that the sheet 358 is secured to the cover element 332 by any suitable fasteners 333.

As can be seen in FIG. 6E, it is preferred that the cover element 332 is positioned to define a gap 350 between the preselected parts 52 of the containers 22 and the surface 360. As in other embodiments described above, in one embodiment, the gap 350 preferably is between approximately 3 millimeters and approximately 5 millimeters (approximately 0.118 inch and approximately 0.197 inch). It will be understood that the gap may be somewhat larger if the height of the containers is within a larger tolerance.

Figure 7A:
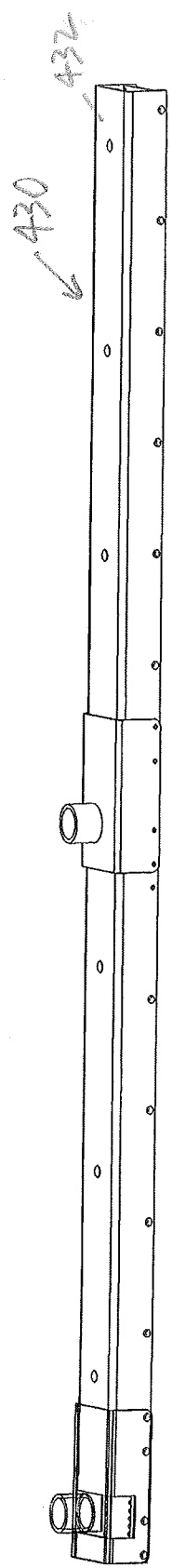
FIG. 7A is an isometric view of an alternative embodiment of the cover assembly of the invention, drawn at a smaller scale.
Figure 7B:
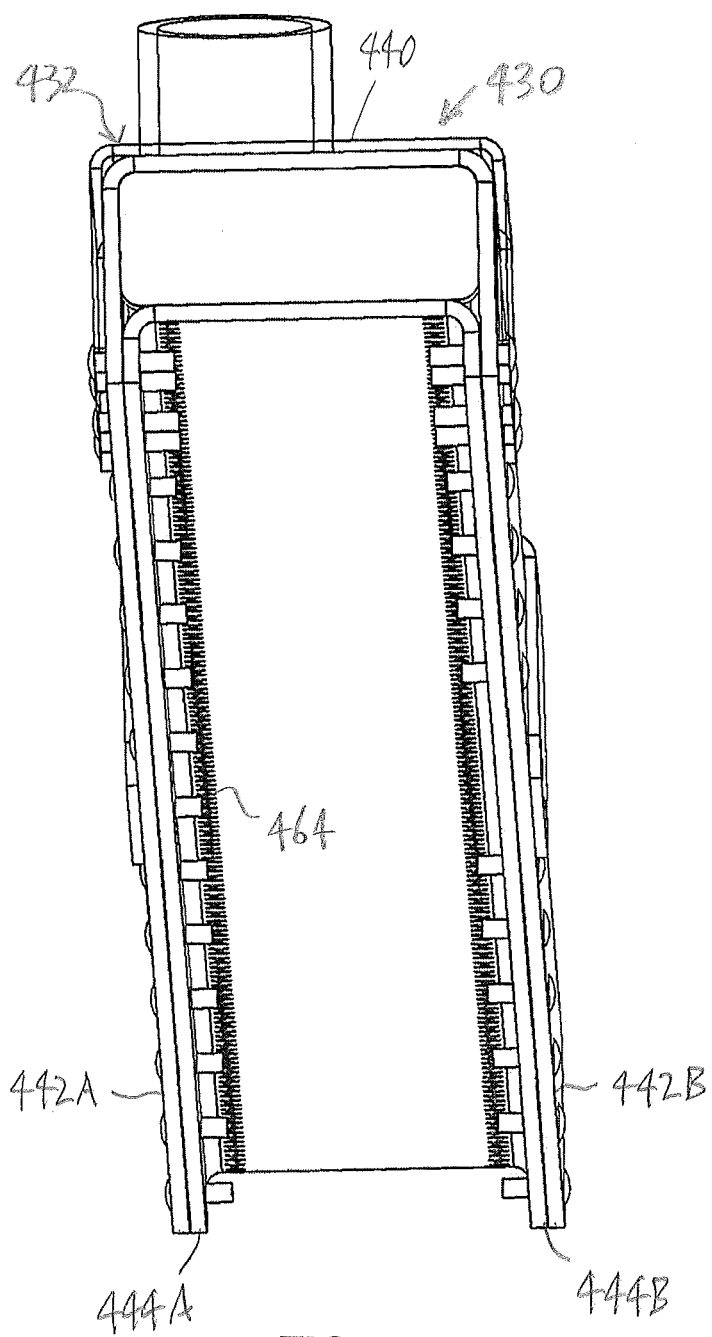
FIG. 7B is an isometric view of a portion of the cover assembly of FIG. 7A, drawn at a larger scale.
Figure 7C:
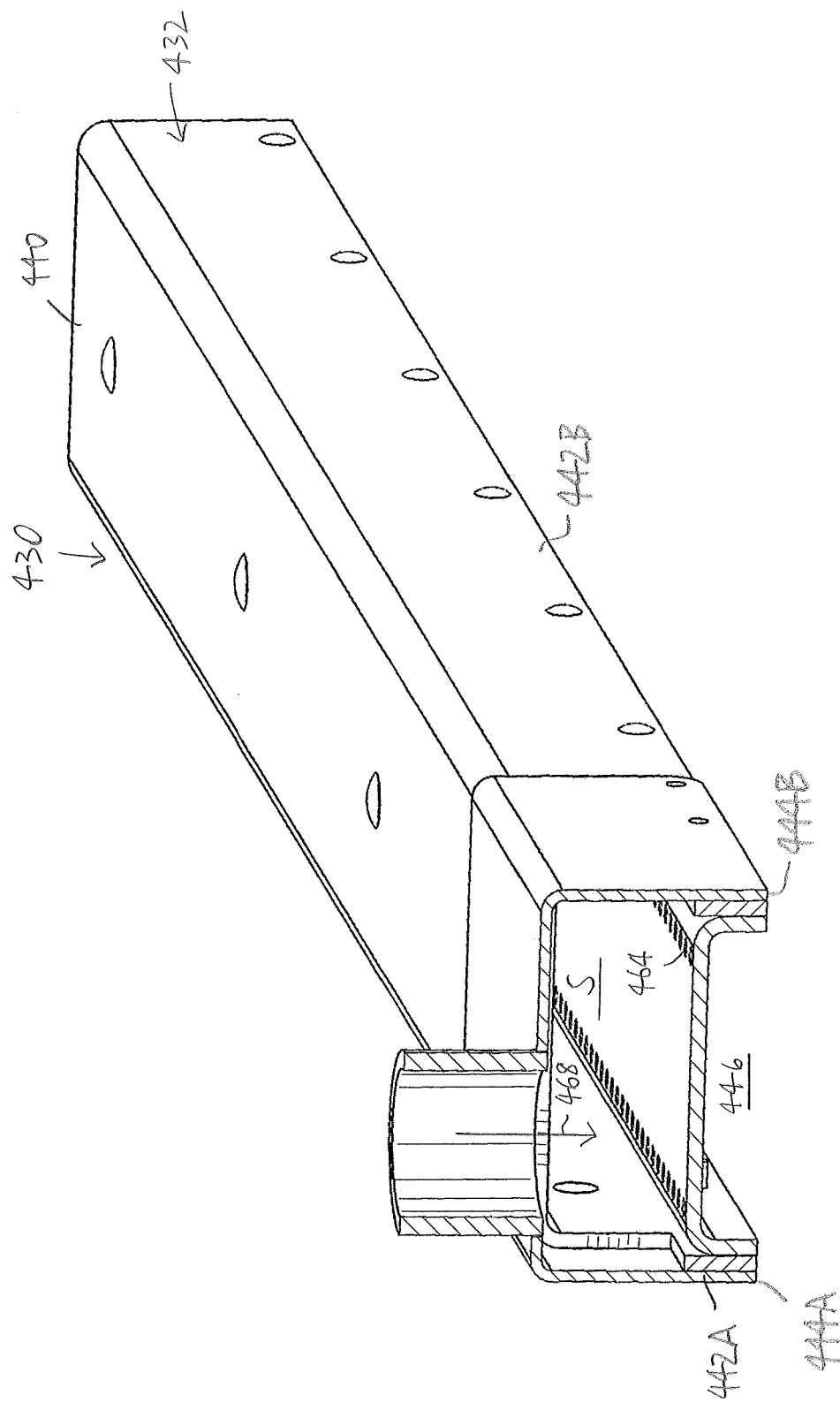
FIG. 7C is an isometric view of the cover assembly of FIGS. 7A and 7B, including a cross-section thereof.
Figure 7D:
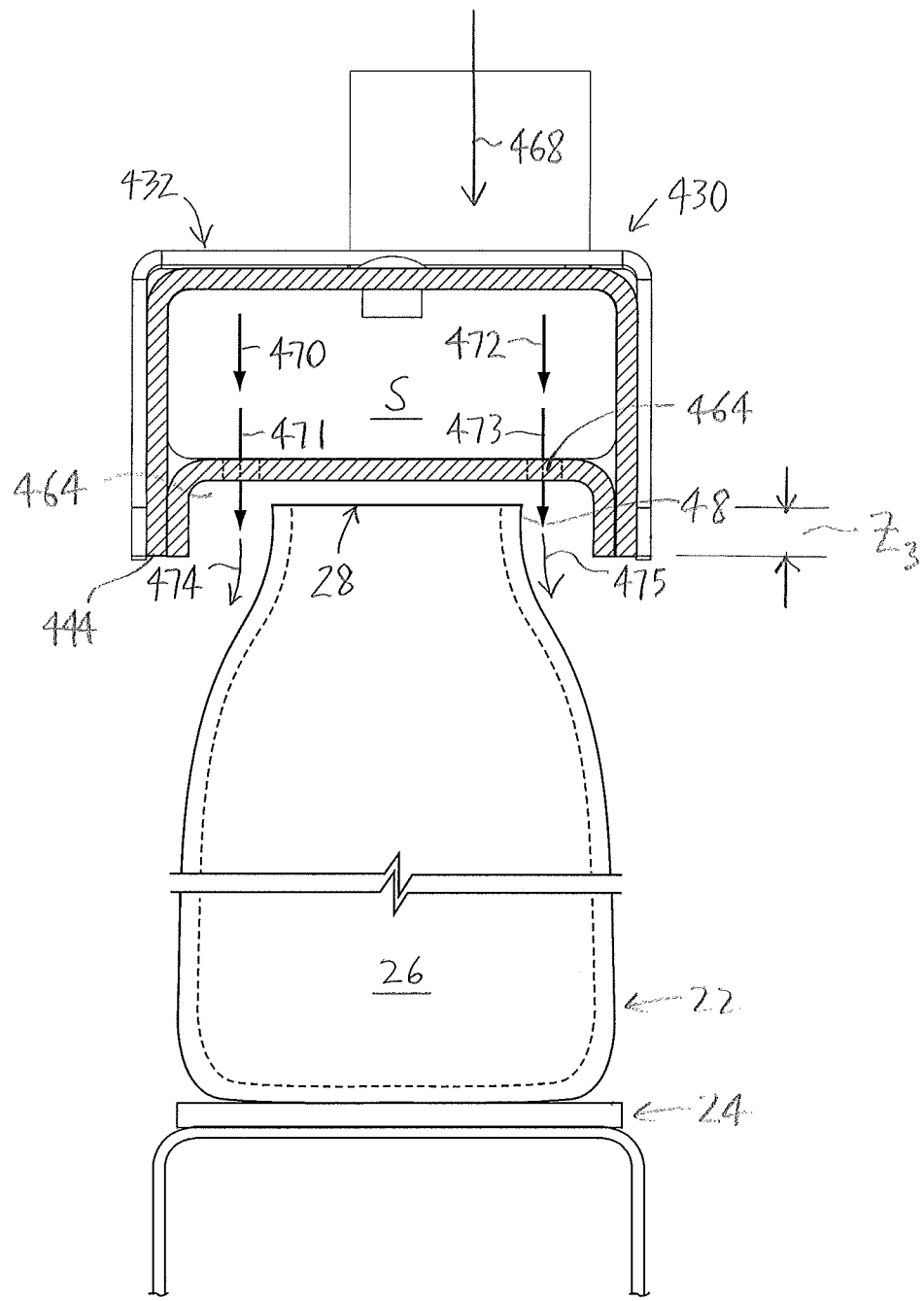
FIG. 7D is a cross-section of the cover assembly of FIGS. 7A-7C with the container located on the conveyor, drawn at a larger scale.

Another alternative embodiment of the guide rail system 420 of the invention is illustrated in FIGS. 7A-7D. As can be seen in FIGS. 7C and 7D, an embodiment of the guide rail system 420 of the invention preferably includes one or more cover elements 432. Preferably, the cover element 432 defines a covered region 446 (FIGS. 7C, 7D) in which the predetermined portion 48 (FIG. 7D) of the container 22 is receivable, to locate the predetermined portion 48 at least partially inside the cover element 432. The cover element 432 preferably includes a number of apertures 464 through which one or more gases (not shown) are directed under a preselected pressure onto at least the predetermined portions 48 of the respective containers, to impede ingress of the foreign matter into the respective interior portions 26 of the containers 22.

The distance between the preselected parts 52 of the container 22 and a lower edge 444 of the cover element 432 is identified as "$Z_3$" in FIG. 7D for convenience. As described above, it is preferred that the distance "$Z_3$" is at least a preselected distance. In one embodiment, for instance, the minimum preselected distance is about 0.25 inch (approximately 0.635 cm). It will be understood that a number of elements are omitted from FIG. 7D for clarity of illustration.

In one embodiment, it is preferred that air under pressure is directed into the interior space "S", as schematically illustrated by arrow 468 in FIGS. 7C and 7D. The air under pressure that is inside the interior space "S" exits therefrom via the apertures 464, as schematically illustrated by arrows 470, 471, 472, and 473 in FIG. 7D. As schematically illustrated by arrows 474 and 475, the pressurized air is directed by the apertures 464 onto the predetermined portions 48 of the containers 22, thereby substantially enveloping the upper region of the container 22, to impede the ingress of foreign matter into the interior portion 26 of the container 22.

The gas or gases may be any suitable gas or gases, subjected to any suitable pressure. It will be understood that, for the purposes hereof, the gases may be, for instance, air, and the pressure to which the air is subjected is substantially greater than atmospheric pressure. Accordingly, for the purposes hereof, "under pressure" is understood to mean under substantially more than atmospheric pressure, and the preselected pressure to which the gases are subjected preferably is any suitable pressure greater than atmospheric pressure. In one embodiment, the gas or gases preferably are subjected to a preselected pressure that is determined based on the velocity of the gas or gases flowing through the apertures 464 that results from the preselected pressure. Those skilled in the art would appreciate that the gases' velocity would depend on a number of factors, only one of which is the pressure to which the gas or gases in the cover assembly 430 are subjected. For instance, the size and number of the apertures 464 would also affect the velocity of the gas or gases through the apertures 464. For instance, a preselected velocity may be determined, and the preselected pressure that can result in the preselected velocity may then be selected. Any suitable velocity may be the preselected velocity. For example, in one embodiment, it is believed that the air velocity should be between approximately 0.2 meters per second and 0.5 meters per second.

The gases (e.g., air) under pressure may be provided by any suitable source. For instance, in one embodiment, the air under pressure preferably is provided by one or more fill stations (not shown).

In one embodiment, the cover element 432 preferably includes a central portion 440 and a pair of side portions 442A, 442B (FIG. 7C). As can be seen in FIG. 7C, the side portions 442A, 442B respectively extend between the central portion 440 and lower edges 444A, 444B thereof.

Preferably, the cover assembly 430 includes a lower central portion 454 that partially defines the interior space "S".

Figure 8B:
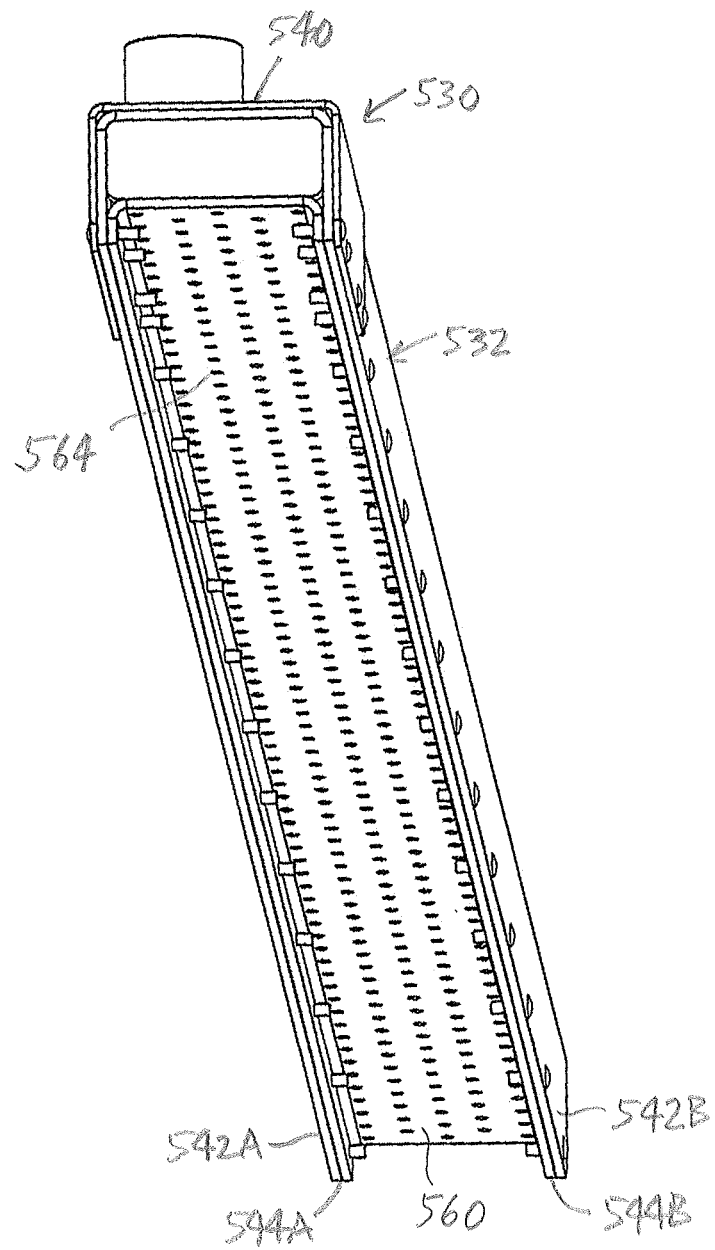
FIG. 8B is an isometric view of a portion of the cover assembly of FIG. 8A, drawn at a larger scale.
Figure 8C:
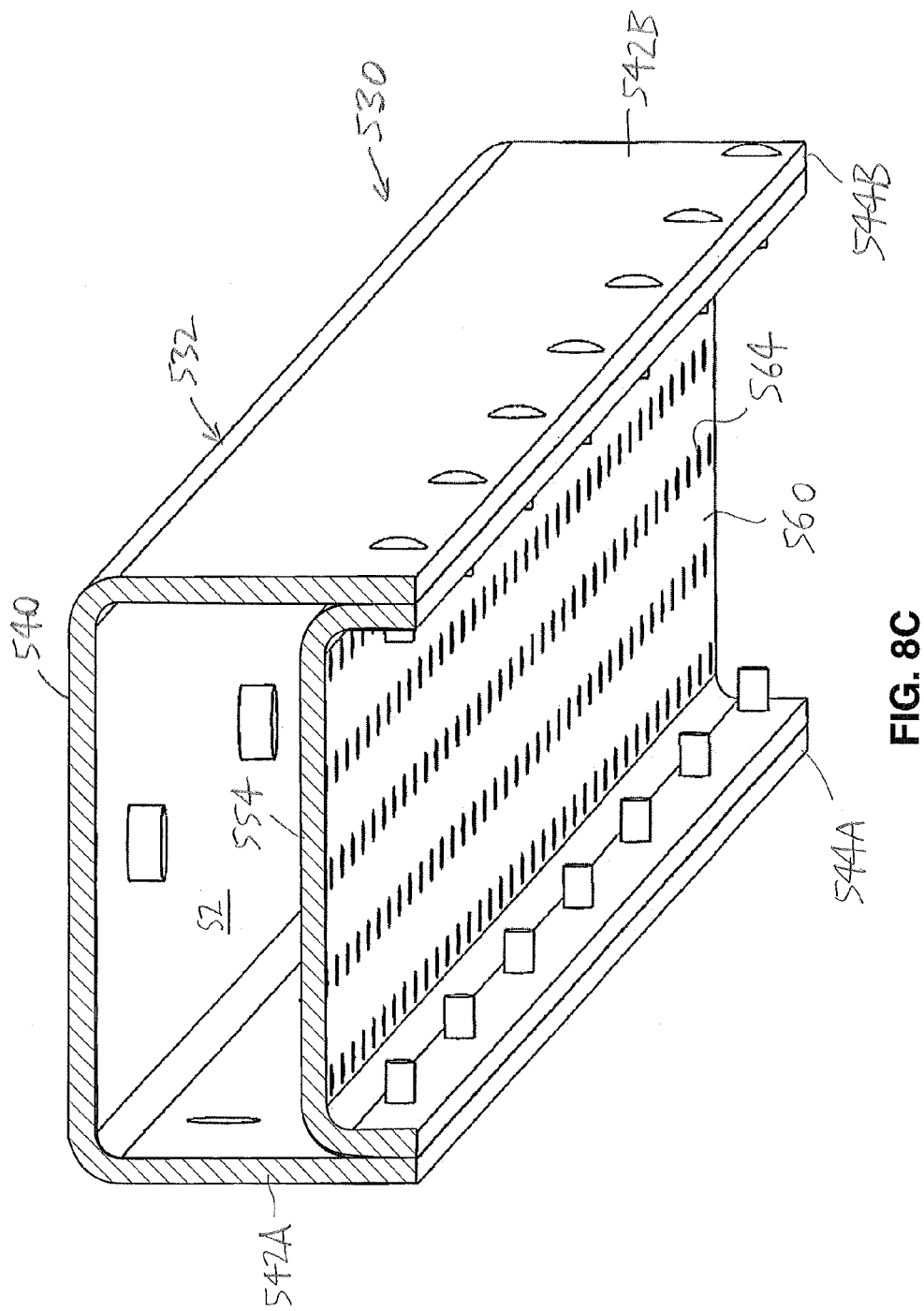
FIG. 8C is another isometric view of the cover assembly of FIGS. 8A and 8B including a cross-section, drawn at a larger scale.

Another embodiment of the cover assembly 530 of the invention is illustrated in FIGS. 8A-8D. Preferably, the cover assembly 530 includes a cover element 532 having a central portion 540 and a pair of side portions 542A, 542B. As can be seen in FIG. 8C, each side portion 542A, 542B respectively extends to a lower edge 544A, 544B.

It is also preferred that the cover assembly 530 additionally includes a central contact portion 554 secured to the cover element 532 and spaced a predetermined distance 562 apart from the central portion 540 to at least partially define an interior space "S2" therebetween. The central contact portion 554 preferably includes a substantially planar surface 560 for engagement with the preselected part(s) 52 of the containers 22 (FIG. 8D), i.e., when the containers 22 tip. Preferably, the central contact portion 554 also includes a number of apertures 564 to enable one or more gases under pressure directed into the interior space "S2" to exit therethrough, and thereafter to move over at least predetermined parts 566 of the containers 22, to impede ingress of foreign matter into the containers 22.

Figure 8D:
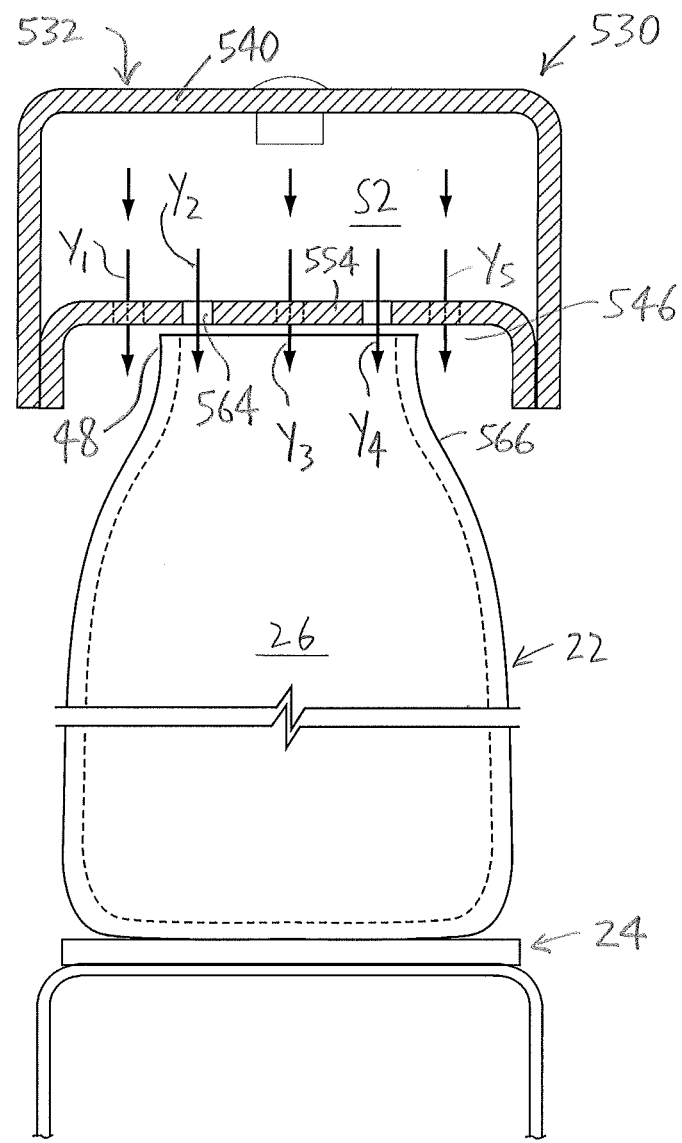
FIG. 8D is a cross-section of the cover assembly of FIGS. 8A-8C with the container located on the conveyor, drawn at a larger scale.

From the foregoing, it can be seen that the cover assembly 530 is locatable in a preselected position relative to the conveyor(s) 24 (FIG. 8D). Preferably, the cover assembly 530 includes the cover element 532 defining a covered region 546 in which the predetermined portion 48 of each container 22 is receivable, when each container 22 is positioned in the predetermined location therefor on the conveyor 24, for at least partially impeding ingress of foreign matter into the interior portion 26 of the container 22.

It can also be seen from the foregoing that the gases under pressure preferably are directed into the covered region 546 (FIG. 8D), for at least partially impeding ingress of the foreign matter into the interior portions 26 of the respective containers 22. It is preferred that the central contact portion 554 includes the substantially smooth surface 560 for slidable engagement with the preselected part(s) 52 of the containers 22, i.e., when the containers 22 tip.

As noted above, in one embodiment, the surface 560 of the central contact portion 554 preferably includes a number of apertures 564 through which one or more gases under a preselected pressure are directed toward the opening 28 of each container 22, for at least partially impeding ingress of the foreign matter to the interior portions 26 of the respective containers 22. It will be understood that, as noted above, in one embodiment, the preselected pressure preferably is substantially above atmospheric pressure. It is also preferred that the gases (e.g., air) that are subject to the preselected pressure are directed by the apertures 564 to substantially surround the opening 28 of each container 22, for at least partially impeding ingress of the foreign matter to the interior portions 26 of the respective containers 22. Arrangements of the apertures that would achieve this can be seen, for example, in FIGS. 7D and 9C.

The apertures may have any suitable size(s) and shape(s), and may be formed in any suitable pattern. For example, in one embodiment, the apertures may be substantially circular, or may be in the form of slots. It will be understood that the proportion of the area of the central contact portion that is represented by the apertures may vary. It is believed that the ratio of the surface area of the central contact portion to the apertures preferably is approximately 95:5. However, those skilled in the art would appreciate that the form and size of the apertures is determined by a number of factors, including the preselected velocity of the gases through the apertures.

As can be seen in FIGS. 7A-9C, the apertures may be formed in the cover element in various patterns. In one embodiment, illustrated in FIGS. 8A-8D, the apertures 564 preferably are formed so that the gases under the preselected pressure are directed into the interior portion 26 of the container 22, as well as over the predetermined portion 48 (i.e., the exterior of the container 22). In FIG. 8D, the movement of the gases through the apertures 564 is schematically illustrated by arrows "$Y_1$"-"$Y_5$". It will be understood that a number of elements are omitted from FIG. 8D for clarity of illustration.

Figure 9A:
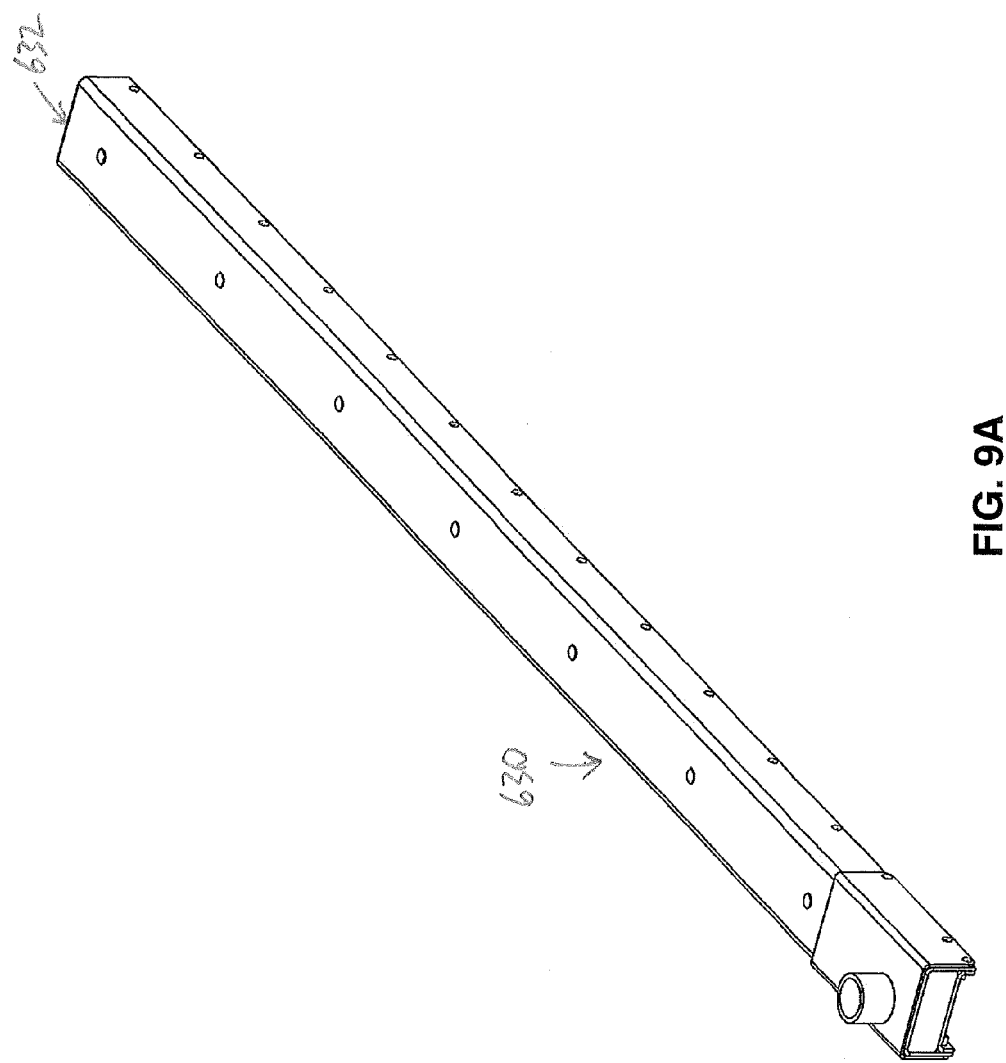
FIG. 9A is an isometric view of an alternative embodiment of the cover assembly of the invention, drawn at a smaller scale.
Figure 9B:
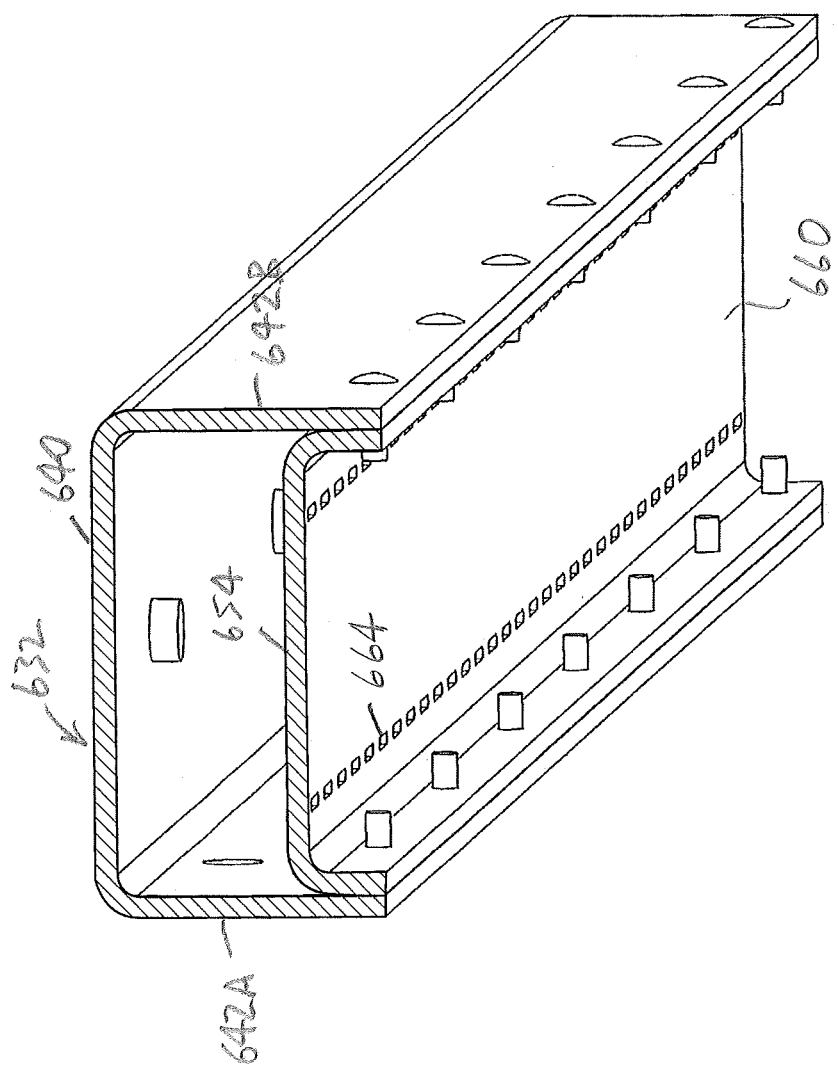
FIG. 9B is an isometric view of a portion of the cover assembly of FIG. 9A including a cross-section, drawn at a larger scale.
Figure 9C:
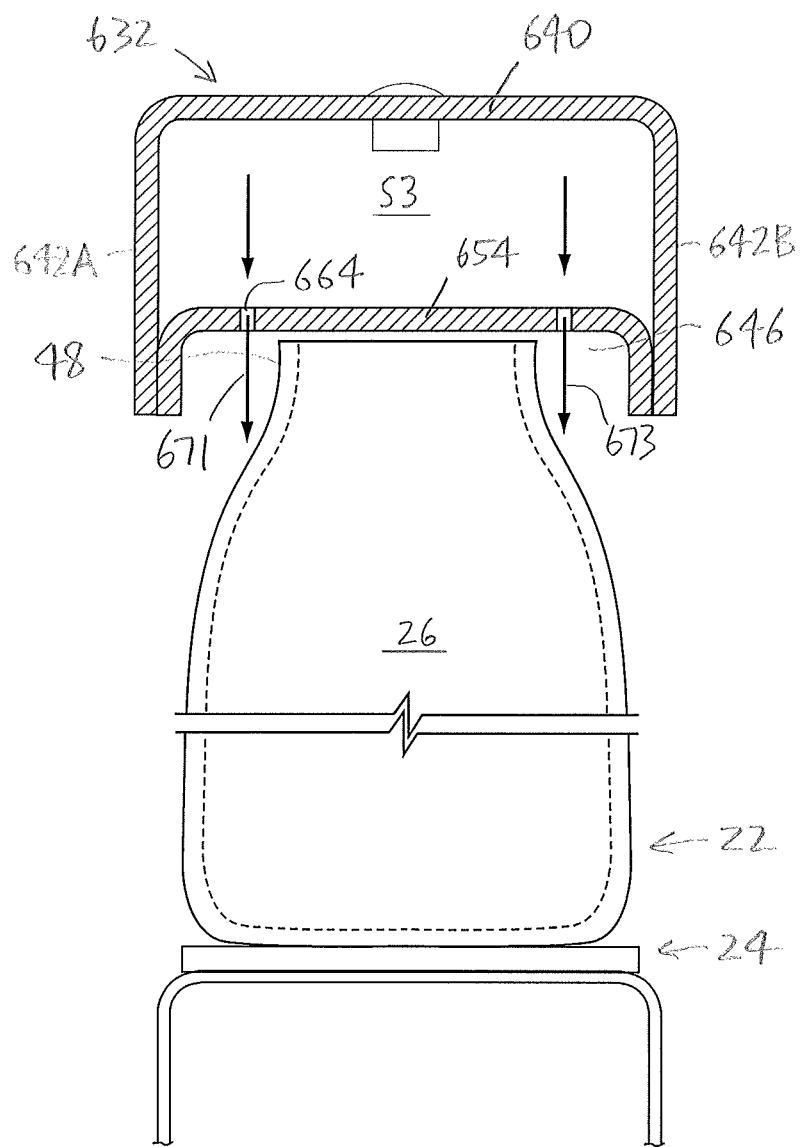
FIG. 9C is a cross-section of the cover assembly of FIGS. 9A and 9B with the container located on the conveyor, drawn at a larger scale.

In another embodiment of the cover assembly 630 of the invention illustrated in FIGS. 9A-9C, the cover assembly 630 preferably includes a cover element 632 with a central contact portion 654 having a number of apertures 664 therein. As can be seen in FIG. 9C, the cover element 632 preferably includes a central portion 640 and side portions 642A, 642B. An interior space "S3" is at least partially defined by the central portion 640, the central contact portion 654, and the side portions 642A, 642B.

As can also be seen in FIGS. 9B and 9C, the central contact portion 654 preferably includes a substantially smooth surface 660 engageable with the preselected parts 52 of the respective containers, to maintain the containers 22 in the predetermined locations therefor on the conveyor 24.

As can be seen in FIGS. 9B and 9C, in the cover assembly 630, the apertures 664 are located so that the gases directed therethrough are not directed into the interior portions 26 of the respective containers 22. Instead, the gases are directed onto the predetermined portion 48 of the container 22, as schematically illustrated by arrows "671" and "673" in FIG. 9C. It will be understood that a number of elements are omitted from FIG. 9C for clarity of illustration.

Figure 10:
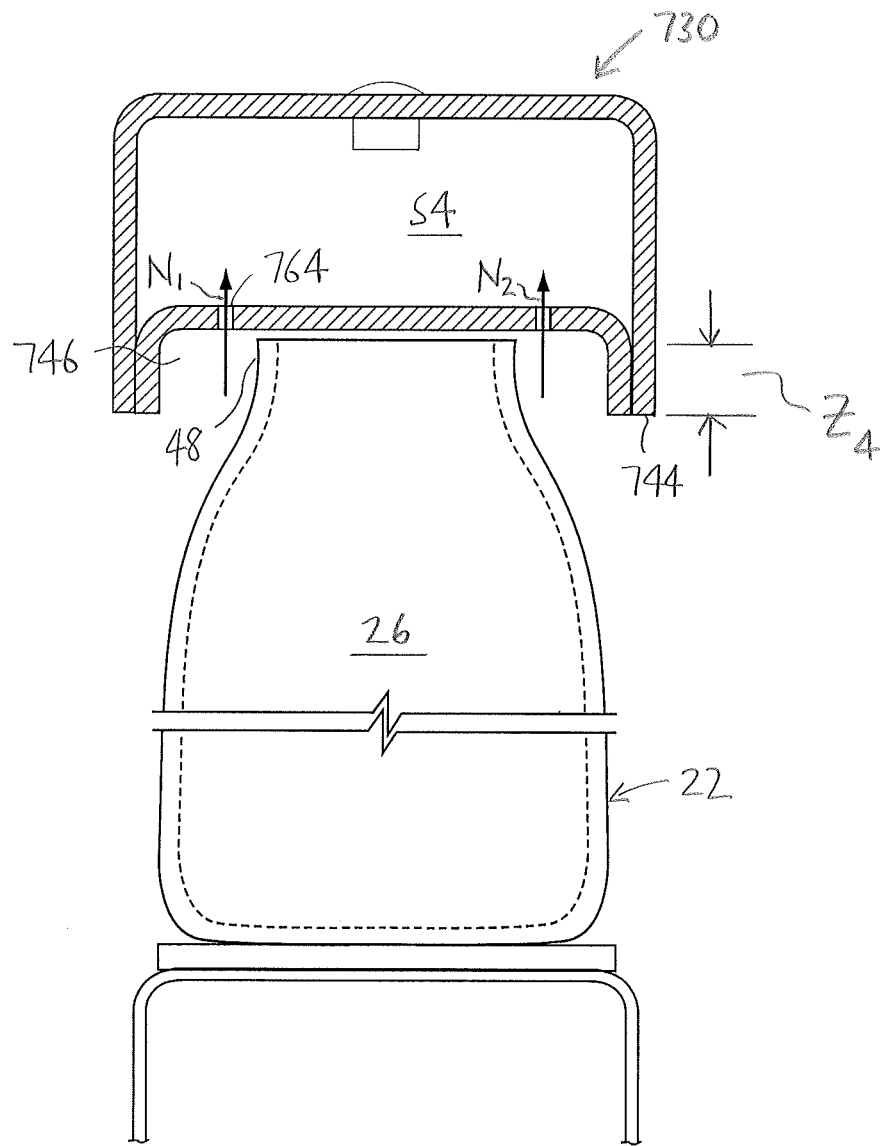
FIG. 10 is a cross-section of an alternative embodiment of the cover assembly of the invention.

In an alternative embodiment, the gases (e.g., air) that are in an interior space "S4" in an alternative embodiment of the cover assembly 730 preferably are subjected to negative pressure, i.e., subjected to a predetermined pressure that is less than atmospheric pressure. As illustrated in FIG. 10, a cover region 746 preferably is defined by the cover assembly 730, in which the predetermined portion 48 of the container 22 is located. As noted above, the predetermined portion 48 preferably is the part extending a distance between the preselected parts 52 to a point parallel to a lower edge 744 of a cover element 732 of the cover assembly 730. This distance is identified by "$Z_4$" in FIG. 10, for convenience. In one embodiment, the distance "$Z_4$" preferably is at least about 0.25 inch (0.635 cm). It will be understood that a number of elements are omitted from FIG. 10 for clarity of illustration.

Because the air in the interior space is subjected to the predetermined negative pressure, the air in the covered region 746 is drawn into the interior space "S4" via apertures 764. The flow of the air from the covered region 746 and into the interior space "S4" is schematically illustrated by arrows "$N_1$" and "$N_2$" in FIG. 10. Any foreign matter in the covered region 746 preferably is drawn from the covered region 746 into the interior space "S4". Those skilled in the art would appreciate that the foreign matter drawn into the interior space "S4" is thereafter removed therefrom. The foreign matter may be disposed of or otherwise dealt with, according to known methods.

Accordingly, and as can be seen in FIG. 10, in one embodiment, the cover element 732 preferably includes a number of the apertures 764 through which air (and any foreign matter therein) is drawn into the cover element 732, to impede ingress of the foreign matter into the interior portions 26 of the containers.

In one embodiment of a method of the invention, the method includes providing the cover assembly 30 including the cover element(s) 32 that define the covered region 46 in which the predetermined portion 48 of each container 22 is receivable, when the container 22 is positioned on the conveyor 24 in the predetermined location therefor. Preferably, the cover element 32 is positioned so that the predetermined portion 48 of each container 22 is movable through the covered region 46 by the conveyor 24, to at least partially impede ingress of the foreign matter into the respective interior portions 26 of the containers 22.

In one embodiment, the method preferably also includes engaging one or more central contact portions 154, 354, 554, 654 of the cover element 32 with one or more preselected parts 52 of the container 22 when tipped, to at least partially locate the container 22 in the predetermined location therefor on the conveyor 24. As noted above, the engagement takes place when the upper end of the container tips, i.e., when the upper end of the container becomes non-aligned vertically with the center of gravity "COG".

It is also preferred that the method additionally includes directing one or more gases under a preselected pressure through a number of apertures 464, 564, 664 in the cover element 432, 532, 632 into the covered region, to at least partially impede ingress of the foreign matter into the respective interior portions 26 of the containers 22. As is also noted above, alternatively, the air in the covered region and any foreign matter therein may be drawn therefrom via the apertures in the cover element.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A guide rail system for guiding containers, each said container comprising an interior portion defined therein for receiving a product and an opening in fluid communication with the interior portion, the guide rail system comprising:
   at least one movable conveyor for moving the containers positioned thereon;
   a cover assembly comprising at least one cover element;
   at least one structural element to which said at least one cover element is secured, for locating said at least one cover element in a preselected location relative to the openings of the containers positioned on and moved by said at least one moving conveyor, for at least partially impeding ingress of foreign matter to the interior portions of the containers;
   said at least one cover element at least partially defining a covered region in which a predetermined portion of each said container positioned on said at least one conveyor is receivable to locate the predetermined portion of each said container at least partially inside said at least one cover element, the predetermined portion of each said container comprising the opening thereof; and
   said at least one cover element comprising a central contact portion for slidable engagement with at least one preselected part of the predetermined portion of the containers when tipped, the predetermined portion comprising said at least one preselected part, to at least partially locate the containers in predetermined locations respectively on said at least one conveyor.

2. A guide rail system according to claim 1 in which said at least one structural element comprises at least one central adjustable point device comprising a central adjustment element to which the cover assembly is secured, for moving the cover assembly vertically and laterally to locate the central contact portion in a predetermined central location relative to the containers.

3. A guide rail system according to claim 1 in which said at least one cover element comprises a plurality of apertures through which at least one gas is directed downwardly under a preselected pressure onto the predetermined portion of each said container around the opening thereof, to impede ingress of the foreign matter into the respective interior portions of the containers.

4. A guide rail system according to claim 1 in which said at least one cover element comprises a plurality of apertures through which air from the covered region, and the foreign matter therein, is drawn into the cover element, to impede ingress of the foreign matter into the respective interior portions of the containers.

5. A guide rail system according to claim 1 in which:
   said at least one cover element comprises a central portion and a pair of side portions, each said side portion extending from the central portion to a lower edge thereof;
   the central contact portion is spaced a predetermined distance apart from the central portion to at least partially define an interior space therebetween;
   the central contact portion comprises:
      a substantially planar surface for engagement with said at least one preselected part of each said container; and
      a plurality of apertures to enable at least one gas under a preselected pressure directed into the interior space to exit therethrough to move over said at least one predetermined part of each said container, to impede ingress of foreign matter into each said container.

6. A cover assembly locatable in a preselected position relative to at least one movable conveyor for moving containers, each said container comprising an interior portion for receiving a product therein and an opening in fluid communication with the interior portion, the cover assembly comprising:
   at least one cover element defining a covered region in which a predetermined portion of each said container is receivable when each said container is positioned in a predetermined location therefor on and moved by said at least one moving conveyor for at least partially impeding ingress of foreign matter into the interior portion of each said container, the predetermined portion of each said container comprising the opening thereof;
   said at least one cover element comprising a central portion and at least one side portion, said at least one side portion extending from the central portion to a lower edge of said at least one side portion, said at least one cover element being formed to locate the lower edge in a preselected location relative to the opening when the predetermined portion of each said container is located in the covered region; and
   said at least one cover element comprising a central contact portion positioned for sliding engagement with at least one preselected part of each of the containers when tipped, the predetermined portion comprising said at least one preselected part, to at least partially locate the containers in predetermined locations respectively on said at least one moving conveyor; and said at least one cover element comprising a plurality of apertures through which at least one gas under a preselected pressure is directed into the covered region, for at least partially impeding ingress of the foreign matter to the interior portions of the containers.

7. A guide rail system for guiding containers, each said container comprising an interior portion defined therein for receiving a product and an opening in fluid communication with the interior portion, the guide rail system comprising:
- at least one movable conveyor for moving the containers, said at least one conveyor defining a path along which the containers are moved thereby;
- a cover assembly comprising at least one cover element comprising at least one central contact portion for slidably engaging at least one preselected part of the containers when tipped, to at least partially locate the containers positioned on and moved by said at least one moving conveyor in preselected positions relative to the path;
- at least one central adjustable point device for moving said at least one central contact portion vertically and laterally for alignment with the path in a predetermined central location relative to each said container to permit slidable engagement of said at least one central contact portion with said at least one preselected part of each said container when tipped;
- said at least one cover element being mounted to said at least one central adjustable point device and positionable thereby in a preselected central location relative to the opening of the container, for at least partially impeding ingress of foreign matter to the respective interior portions of said containers; and
- said at least one central contact portion comprising a substantially smooth surface for slidable engagement with said at least one preselected part of each said container when tipped.

8. A guide rail system according to claim 7 in which said surface of said at least one central contact portion comprises a plurality of apertures through which at least one gas under a preselected pressure is directed toward the opening of each said container, for at least partially impeding ingress of the foreign matter to the interior portions of said containers.

9. A guide rail system according to claim 7 in which said surface of said at least one central contact portion comprises a plurality of apertures through which at least one gas under a preselected pressure is directed to substantially surround the opening of each said container, for at least partially impeding ingress of the foreign matter to the interior portions of the containers.

10. A method of impeding ingress of foreign matter into respective interior portions of containers positioned on at least one movable conveyor, the interior portion of each said container being in fluid communication with an opening thereof to permit a product to be received in the interior portion via the opening, the method comprising:
(a) providing a cover assembly comprising:
- at least one cover element defining a covered region in which a predetermined portion of each said container is receivable when each said container is positioned in the predetermined location therefor on said at least one conveyor, the predetermined portion of each said container comprising the opening thereof;
- at least one central contact portion at least partially defining the covered region;
(b) positioning said at least one cover element such that the predetermined portion of each said container is movable through the covered region by said at least one conveyor, to at least partially impede ingress of foreign matter through the opening into the respective interior portions of the containers;
(c) positioning the containers on said at least one conveyor;
(d) with at least one central adjustable point device, vertically and laterally positioning said at least one central contact portion for engagement with at least one preselected part of the container when tipped, to at least partially locate the container in a predetermined location therefor on said at least one conveyor; and
(e) with said at least one conveyor, moving the containers positioned thereon and supported thereby relative to said at least one cover element.

11. A method according to claim 10 additionally comprising:
(f) providing said at least one central contact portion with a plurality of apertures through which at least one gas is movable; and
(g) directing at least one gas under a preselected pressure through the apertures in said at least one cover element into the covered region, to at least partially impede ingress of foreign matter into the respective interior portions of the containers.

12. A method according to claim 10 additionally comprising:
(f) providing said at least one central contact portion with a plurality of apertures through which at least one gas is moveable; and
(g) drawing air from the covered region and the foreign matter therein through the apertures in said at least one cover element, to at least partially impede ingress of the foreign matter into the respective interior portions of the containers.

* * * * *